US011634104B2

(12) United States Patent
Moeller et al.

(10) Patent No.: US 11,634,104 B2
(45) Date of Patent: Apr. 25, 2023

(54) SENSING AND CONTROLLING STATES OF LOCKING MECHANISMS

(71) Applicant: KEEP TECHNOLOGIES, INC., Atlanta, GA (US)

(72) Inventors: David Moeller, Atlanta, GA (US); Jonathan Manuzak, Atlanta, GA (US); Ian Mathews, Atlanta, GA (US); Rahul Maran, Atlanta, GA (US); Nick Allison, Atlanta, GA (US)

(73) Assignee: Keep Technologies, Inc., Atlanta, GA (US)

( * ) Notice: Subject to any disclaimer, the term of this patent is extended or adjusted under 35 U.S.C. 154(b) by 4 days.

(21) Appl. No.: 17/584,159

(22) Filed: Jan. 25, 2022

(65) Prior Publication Data
US 2022/0169205 A1 Jun. 2, 2022

Related U.S. Application Data

(63) Continuation-in-part of application No. 17/157,369, filed on Jan. 25, 2021, which is a continuation of
(Continued)

(51) Int. Cl.
*B60R 25/31* (2013.01)
*B60R 25/30* (2013.01)
(Continued)

(52) U.S. Cl.
CPC ............... *B60R 25/31* (2013.01); *B60R 1/00* (2013.01); *B60R 11/00* (2013.01); *B60R 25/04* (2013.01); *B60R 25/102* (2013.01); *B60R 25/1003* (2013.01); *B60R 25/1004* (2013.01); *B60R 25/1009* (2013.01); *B60R 25/1018* (2013.01); *B60R 25/1025* (2013.01); *B60R 25/24* (2013.01); *B60R 25/245* (2013.01); *B60R 25/25* (2013.01); *B60R 25/305* (2013.01);
(Continued)

(58) Field of Classification Search
CPC ................................. E05B 81/06; B23P 19/04
See application file for complete search history.

(56) References Cited

U.S. PATENT DOCUMENTS

| | | | |
|---|---|---|---|
| 8,070,118 B1* | 12/2011 | Collins | ................. A47F 5/0861 248/225.11 |
| 2008/0237155 A1* | 10/2008 | Forest | ...................... B62H 3/12 211/20 |

(Continued)

*Primary Examiner* — Fabricio R Murillo Garcia
(74) *Attorney, Agent, or Firm* — Morris, Manning & Martin, LLP; Daniel E. Sineway, Esq.; Adam J. Thompson, Esq.

(57) ABSTRACT

An affixable device can include a locking mechanism, a force-limiting mechanism, and a sensing mechanism. The locking mechanism can include an engagement component configured to disable the locking mechanism. The force-limiting mechanism can be configured to limit a locking force of the locking mechanism. The sensing mechanism can be coupled to the engagement component, and can be configured to determine that the force-limiting mechanism has limited the locking force of the locking mechanism. In response to determining the force-limiting mechanism limiting the locking force, the sensing mechanism can cause the engagement component to disable the locking mechanism.

15 Claims, 11 Drawing Sheets

Related U.S. Application Data application No. 16/988,447, filed on Aug. 7, 2020, now Pat. No. 10,899,317.

(60) Provisional application No. 63/141,388, filed on Jan. 25, 2021, provisional application No. 62/883,875, filed on Aug. 7, 2019.

(51) Int. Cl.

| | |
|---|---|
| B60R 25/25 | (2013.01) |
| B60R 25/10 | (2013.01) |
| B60R 25/102 | (2013.01) |
| B60R 11/00 | (2006.01) |
| B60R 25/34 | (2013.01) |
| G01B 17/00 | (2006.01) |
| G01J 5/00 | (2022.01) |
| G01P 13/00 | (2006.01) |
| B60R 25/24 | (2013.01) |
| G06F 3/01 | (2006.01) |
| G06F 3/16 | (2006.01) |
| G06F 8/65 | (2018.01) |
| G06F 21/57 | (2013.01) |
| G06Q 20/10 | (2012.01) |
| G06Q 20/32 | (2012.01) |
| G06Q 20/40 | (2012.01) |
| G06Q 30/06 | (2012.01) |
| H04L 9/06 | (2006.01) |
| G06Q 30/0601 | (2023.01) |
| H04L 9/08 | (2006.01) |
| H04L 9/32 | (2006.01) |
| H04W 4/021 | (2018.01) |
| B60R 25/32 | (2013.01) |
| B60R 25/33 | (2013.01) |
| G01V 11/00 | (2006.01) |
| G06T 7/174 | (2017.01) |
| B60R 25/04 | (2013.01) |
| G07C 9/00 | (2020.01) |
| B60R 25/40 | (2013.01) |
| G08B 21/18 | (2006.01) |
| B60R 1/00 | (2022.01) |
| G06V 20/59 | (2022.01) |
| G06V 40/16 | (2022.01) |
| H04L 51/224 | (2022.01) |

(52) U.S. Cl.
CPC ............ *B60R 25/307* (2013.01); *B60R 25/32* (2013.01); *B60R 25/33* (2013.01); *B60R 25/34* (2013.01); *B60R 25/403* (2013.01); *B60R 25/406* (2013.01); *G01B 17/00* (2013.01); *G01J 5/0025* (2013.01); *G01P 13/00* (2013.01); *G01V 11/002* (2013.01); *G06F 3/017* (2013.01); *G06F 3/167* (2013.01); *G06F 8/65* (2013.01); *G06F 21/572* (2013.01); *G06Q 20/102* (2013.01); *G06Q 20/3278* (2013.01); *G06Q 20/40145* (2013.01); *G06Q 30/0635* (2013.01); *G06T 7/174* (2017.01); *G06V 20/59* (2022.01); *G06V 40/172* (2022.01); *G07C 9/00182* (2013.01); *G08B 21/182* (2013.01); *H04L 9/0643* (2013.01); *H04L 9/0869* (2013.01); *H04L 9/3231* (2013.01); *H04L 51/224* (2022.05); *H04W 4/021* (2013.01); *B60R 2011/0007* (2013.01); *B60R 2025/0405* (2013.01); *B60R 2025/1013* (2013.01); *B60R 2300/103* (2013.01); *B60R 2300/8006* (2013.01); *B60R 2300/8073* (2013.01); *B60R 2325/10* (2013.01); *B60R 2325/101* (2013.01); *B60R 2325/103* (2013.01); *B60R 2325/20* (2013.01); *B60R 2325/205* (2013.01); *G06T 2207/10016* (2013.01); *G07C 2009/0019* (2013.01); *G07C 2009/00396* (2013.01); *G07C 2009/00539* (2013.01); *G07C 2009/00769* (2013.01); *G07C 2009/00984* (2013.01); *H04L 2209/84* (2013.01)

(56) References Cited

U.S. PATENT DOCUMENTS

| | | | |
|---|---|---|---|
| 2014/0157838 A1* | 6/2014 | Nave | E05B 67/22 70/52 |
| 2014/0285611 A1* | 9/2014 | Murayama | G03G 15/50 347/257 |
| 2017/0096225 A1* | 4/2017 | Smith | B60N 2/0224 |
| 2018/0319186 A1* | 11/2018 | Zhu | B41K 1/003 |
| 2020/0099168 A1* | 3/2020 | Inoue | H01R 13/26 |

\* cited by examiner

SENSING AND CONTROLLING STATES OF LOCKING MECHANISMS

CROSS REFERENCE TO RELATED APPLICATIONS

This application claims the benefit of and priority to U.S. Provisional Patent Application No. 63/141,388, filed Jan. 25, 2021, entitled "SENSING AND CONTROLLING STATES OF LOCKING MECHANISMS," and is a continuation-in-part of U.S. Non-Provisional patent application Ser. No. 17/157,369, filed Jan. 25, 2021 and entitled "PHYSICALLY SECURED DEVICE FOR VEHICLE INTRUSION DETECTION," which is a continuation of U.S. Non-Provisional patent application Ser. No. 16/988,447, filed Aug. 7, 2020, entitled "PHYSICALLY SECURED DEVICE FOR VEHICLE INTRUSION DETECTION," which claims the benefit of and priority to U.S. Patent Application No. 62/883,875, filed Aug. 7, 2019, entitled "SYSTEMS, METHODS, AND APPARATUSES FOR AUTOMOBILE ACCESS AND INTRUSION DETECTION," all of which are incorporated herein by reference in their entireties.

TECHNICAL FIELD

The present systems and processes relate generally to systems, methods, and apparatuses for determining and controlling states of theft prevention apparatuses.

BACKGROUND

Previous approaches to intrusion detection and prevention systems for vehicles generally include outdated technology, such as switches built into door locks, for detecting entry into a locked vehicle. Previous theft prevention devices may be secured to a vehicle, for example, via fasteners or other penetrating mechanisms; however, the devices may not be readily removable upon their being secured. A lack of easy device removability may prevent a potential thief from removing the device; however, lack of removability may be undesirable to a device user due to potential inconvenience and/or damage to the vehicle at the site of installation. Other past approaches provide unsecured devices that are freely removable from a target site; however, such devices, while more easily deployed and removed by a user, are vulnerable to theft. Thus previous solutions may demonstrate an undesirable tradeoff between convenience of device removal and security of device installation, and, accordingly, such solutions may be unsuitable for instances in which a user wishes to secure an installed device against removal while allowing the user convenient removal of the installed device.

Therefore, there exists a long-felt but unresolved need for improved systems, methods, and apparatuses for selectively securing a theft prevention device or apparatus.

BRIEF SUMMARY OF THE DISCLOSURE

Briefly described, and according to one embodiment, aspects of the present disclosure generally relate to systems and processes for detecting and controlling states of theft prevention apparatuses.

A security device can include a first portion and a second portion, the first portion configured to rotate about the second portion between a first position and a second position. The security device can include one or more legs that can be selectively, mechanically coupled to the first portion. In one example, when mechanically coupled, rotating the first portion in a first direction causes the one or more legs to extend and contact a target site, thereby securing a position of the security device. In the same example, rotating the first portion in a second direction (e.g., opposite the first direction) causes the one or more legs to retract from the target site. The one or more legs can be mechanically coupled to the first portion via a force-limiting mechanism, such as a slip-clutch, that limits a locking force of the locking mechanism to a predefined threshold. As used herein, the locking force can generally refer to a force applied by the first portion to the force-limiting mechanism or a force applied by the force-limiting mechanism to the one or more legs.

The security device can include a locking mechanism for controlling the extension and retraction of the one or more legs in response to rotations of the first portion. The locking mechanism can include an engagement component that can be enabled or disabled electronically, for example, in response to a command or in response to a particular sensor reading or determination generated therefrom. The engagement component can include a plurality of pins configured to be received into the force-limiting mechanism. Engaging the engagement component can include causing the receipt of the plurality of pins to be received into the force-limiting mechanism such that the first portion mechanically couples to one or more legs attached to the force-limiting mechanism. In some embodiments, the engaging and disengaging of the locking mechanism can be enabled or disabled by a signal from a monitor application of the security device and/or by input from a computing device, such as a mobile device.

In an exemplary scenario, the first portion includes a plurality of pins for mechanically coupling the first portion to the one or more legs by receiving the plurality of pins into a plurality of apertures of a force-limiting mechanism. The locking mechanism includes an engagement component including a cam that rotates to cause the plurality of pins to lower into or rise from the plurality of apertures and, thereby, enable or disable the locking mechanism (e.g., by mechanically (de)coupling the one or more legs from the first portion). When the engagement component is engaged (e.g., the plurality of pins are received into the force-limiting mechanism), rotating the first portion relative to the second portion does not engage or disengage the locking mechanism (e.g., the position of the one or more legs is unaffected). In contrast, when the engagement component is enabled, rotating the first portion relative to the second portion does engage and/or disengage the locking mechanism. In one example, the security device receives a command from a mobile device, such as a smartphone, to disable the locking mechanism and, in response, the locking mechanism receives a signal that causes the engagement component to be disabled.

The security device can include a sensing component that detects when the force-limiting mechanism limits a locking force of the locking mechanism. The sensing component can include a first circuit section and a second circuit section that are disconnected until the force-limiting mechanism limits a locking force of the locking mechanism.

In an exemplary scenario, the engagement component causes the locking mechanism to engage, and the first portion is rotated in a first direction relative to the second portion, thereby causing one or more legs to extend and contact a target site. Further rotation of the first portion results in a greater locking force at the locking mechanism until the locking force reaches a predetermined threshold. Upon reaching the predetermined threshold, the force-limiting mechanism causes the first portion to "slip" relative to the second portion. The slippage of the first portion relative to the second portion causes the first circuit section and the second circuit section to be conductively bridged, thereby forming a closed electrical circuit. The sensing component detects the completed electrical circuit and, in response, automatically causes the engagement component to disable (e.g., mechanically decoupling the first portion from the one or more legs, thereby disabling the locking mechanism). The locking mechanism, being disabled while in an engaged state, prevents the removal of the security device from the target site until the engagement component is re-enabled (e.g., at which point the first portion may be rotated in a second direction, opposite the first direction, to retract the one or more legs).

The security device can provide feedback to a user to indicate the state of the security device (e.g., locking component enabled or disabled, engagement component enabled or disabled, locking force limited, etc.). The feedback can include providing visual feedback via a light (e.g., a light ring), providing audible feedback (e.g., a chirp or ding), send a message (e.g., a text message, a notification, or an email), or through some other feedback.

According to a first aspect, an affixable device, including: A) a locking mechanism including an engagement component, the engagement component configured to disable the locking mechanism; B) a force-limiting mechanism configured to limit a locking force of the locking mechanism; and C) a sensing mechanism coupled to the engagement component, wherein the sensing mechanism is configured to: 1) determine that the force-limiting mechanism has limited the locking force of the locking mechanism; and 2) in response to the force-limiting mechanism limiting the locking force, cause the engagement component to disable the locking mechanism.

According to a further aspect, the affixable device of the first aspect or any other aspect, wherein the force-limiting mechanism includes a slip clutch mechanism.

According to a further aspect, the affixable device of the first aspect or any other aspect, further including: A) a first portion of a cylindrical body; B) a second portion of the cylindrical body, wherein when the engagement component is engaged, the first portion configured to: 1) rotate about the second portion in a first direction to engage the locking mechanism; and 2) rotate about the second portion in a second direction to disengage the locking mechanism.

According to a further aspect, the affixable device of the first aspect or any other aspect, wherein the sensing mechanism includes: A) a first conductive ring affixed to the first portion; B) a second conductive ring affixed to the first portion, wherein the first conductive ring and the second conductive ring are disconnected from each other; C) a third conductive ring affixed to the second portion and including a plurality of conductors spaced radially along the third conductive ring; D) a first conductive protrusion extending from the first ring in a direction of the third ring and configured to apply a pressure to the third ring; and E) a second conductive protrusion extending from the second conductive ring in a direction of the plurality of conductors and configured to contact individual ones of the plurality of conductors, wherein: 1) a rotation of the first portion relative to the second portion causes the first conductive protrusion and the second conductive protrusion to rotate around the third conductive ring and further causes the second conductive protrusion to contact the individual ones of the plurality of conductors, and 2) wherein the first conductive protrusion and the second conductive protrusion are configured to complete an electrical connection between the first conductive ring and the second conductive ring while the second conductive protrusion is in contact with one of the plurality of conductors.

According to a further aspect, the affixable device of the first aspect or any other aspect, wherein the sensing mechanism includes: A) a first circuit section; B) a second circuit section including a plurality of conductors; and C) at least one contact configured to, in response to the force-limiting mechanism limiting the locking force, provide electrical connectivity between the first circuit section and the second circuit section via at least one of the plurality of conductors.

According to a further aspect, the affixable device of the first aspect or any other aspect, wherein the force-limiting mechanism includes a plurality of retention mechanisms, wherein each retention mechanism of the plurality of retention mechanisms includes a respective spring and a respective protrusion.

According to a second aspect, a vehicle theft-prevention device, including: A) at least one computing device configured to determine an intrusion into a vehicle based at least in part on at least one sensor measurement; B) a locking mechanism including an engagement component, the engagement component configured to disable the locking mechanism; C) a force-limiting mechanism configured to limit a locking force of the locking mechanism; and D) a sensing mechanism coupled to the engagement component, wherein the sensing mechanism is configured to: 1) determine that the force-limiting mechanism has limited the locking force of the locking mechanism; and 2) in response to the force-limiting mechanism limiting the locking force, cause the engagement component to disable the locking mechanism.

According to a further aspect, the vehicle theft-prevention device of the second aspect or any other aspect, wherein the sensing mechanism causes the engagement component to disable the locking mechanism by providing an electrical signal to the at least one computing device, and the at least one computing device is further configured to: A) receive the electrical signal from the sensing mechanism; and B) disable the engagement component of the locking mechanism.

According to a further aspect, the vehicle theft-prevention device of the second aspect or any other aspect, wherein disabling the engagement component of the locking mechanism includes providing an electric signal to a motor unit including a cam, wherein the motor unit is configured to rotate the cam to in response to receiving the electric signal.

According to a further aspect, the vehicle theft-prevention device of the second aspect or any other aspect, wherein the cam is configured to pull a plurality of pins from within a plurality of apertures to mechanically decouple a first portion from a plurality of legs.

According to a further aspect, the vehicle theft-prevention device of the second aspect or any other aspect, wherein the sensing mechanism includes two substantially parallel protrusions.

According to a further aspect, the vehicle theft-prevention device of the second aspect or any other aspect, further including: A) a first portion including a plurality of retractable protrusions positioned at a predetermined radius from a center of the first portion, each of the plurality of retractable protrusions includes a respective spring and a respective spherical ball; and B) a second portion including a plurality of inclined planes positioned at the predetermined radius from a center of the second portion.

According to a further aspect, the vehicle theft-prevention device of the second aspect or any other aspect, wherein the locking force is limited by the force-limiting mechanism when the locking force causes the respective spherical ball from each of the plurality of retractable protrusions to compress the respective spring to pass over one of the plurality of inclined planes.

According to a third aspect, a method of affixing a device, including: A) rotating a first portion of the device relative to a second portion of the device in a particular direction to transition a locking mechanism from an unlocked state to a locked state; B) limiting, via a force-limiting mechanism, a locking force to rotate the first portion relative to the second portion when the locking force exceeds a predefined threshold; C) determining, via a sensing mechanism, that the force-limiting mechanism limited the locking force; and D) causing, via the sensing mechanism, an engagement component to disable the locking mechanism in response to determining that the force-limiting mechanism limited the locking force.

According to a further aspect, the method of the third aspect or any other aspect, further including rotating, via a motor unit, a cam of the engagement component to disable the locking mechanism.

According to a further aspect, the method of the third aspect or any other aspect, further including rotating, via a motor unit, a cam of the engagement component to enable the locking mechanism.

According to a further aspect, the method of the third aspect or any other aspect, wherein the sensing mechanism includes two substantially parallel protrusions extending from the first portion toward the second portion, the two substantially parallel protrusions configured to apply a spring loaded force on the second portion.

According to a further aspect, the method of the third aspect or any other aspect, wherein: A) rotating the first portion of the device relative to the second portion of the device further includes causing the two substantially parallel protrusions to rotate about a conductive ring of the second portion such that a conductive surface of one of the two substantially parallel protrusions contacts the conductive ring and a second conductive surface of another one of the two substantially parallel protrusions contacts one of a plurality of conductors spaced radially around the conductive ring; and B) the plurality of conductors are conductively connected to the conductive ring.

According to a further aspect, the method of the third aspect or any other aspect, wherein determine that the force-limiting mechanism limited the locking force further includes completing a circuit via the two substantially parallel protrusions.

According to a further aspect, the method of the third aspect or any other aspect, further including: A) causing the engagement component to enable the locking mechanism in response to receiving a command from a mobile device; and B) subsequent to the locking mechanism being enabled, rotating the first portion of the device relative to the second portion of the device in a direction opposite the particular direction to transition the locking mechanism from the locked state to the unlocked state.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
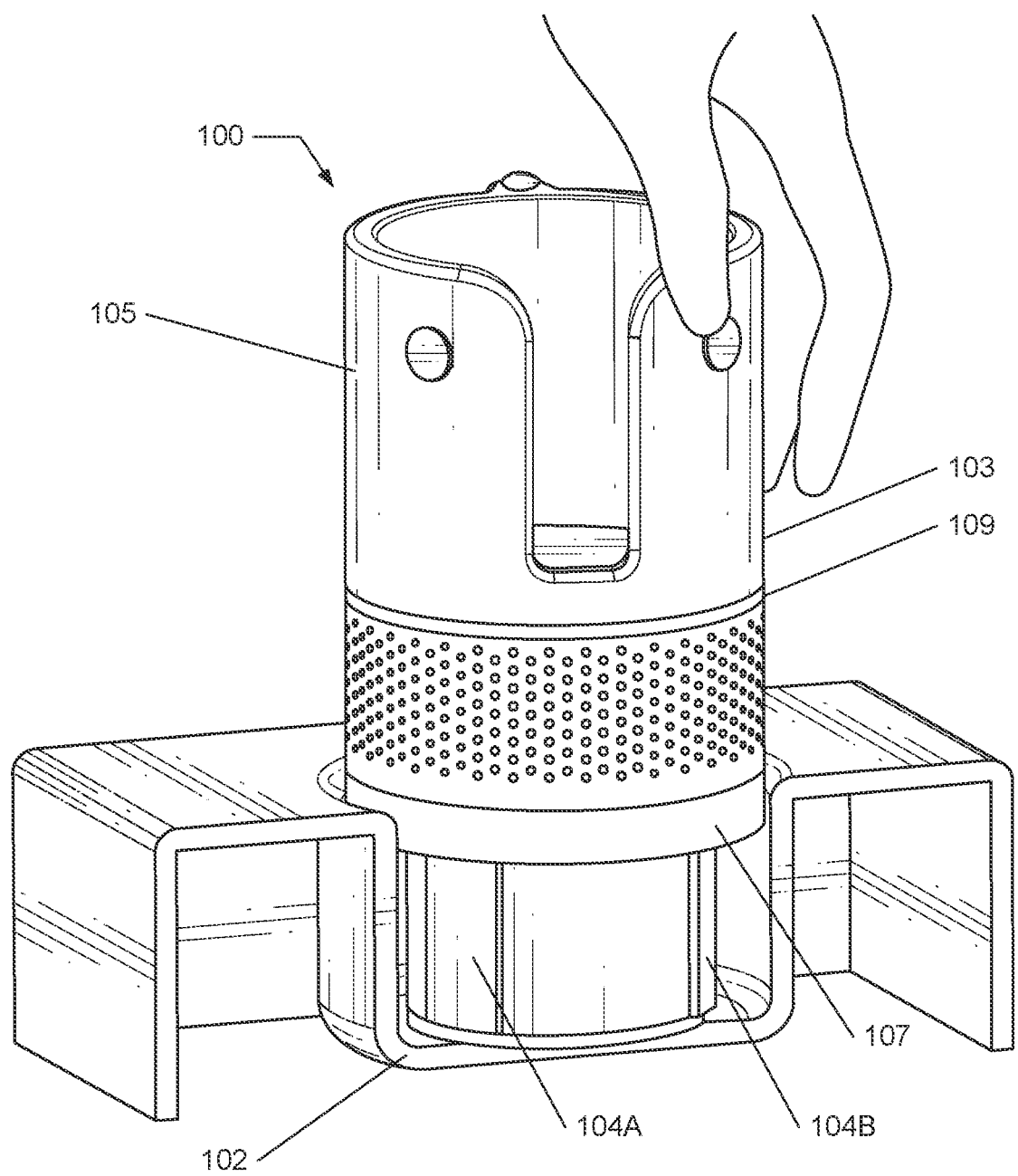
FIG. 1A illustrates exemplary security devices, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to systems and processes for detecting and controlling states of theft prevention devices and apparatuses.

In various embodiments, a theft prevention device (e.g., referred to herein as a "security device") includes one or more sensors and a computing device configured to determine various activities occurring at the security device and proximate to a target site in which the security device is secured. For example, the computing device determines an intrusion into a vehicle based at least in part on at least one sensor measurement from a passive infrared (PR) sensor. In one or more embodiments, the security device includes a locking mechanism for securing the security device at a target site. In various embodiments, when enabled, the locking mechanism allows for the security device to be secured to and removed from a target site by rotating the first portion about the second portion and, thereby, causing one or more legs to extend or retract. According to one embodiment, the locking mechanism includes an engagement component configured to enable and disable the locking mechanism by mechanically (de)coupling the first portion from the one or more legs.

In at least one embodiment, the security device includes a force-limiting mechanism configured to limit a locking force of the locking mechanism. In one or more embodiments, the force-limiting mechanism engages with the engagement component to mechanically couple the first portion and the one or more legs. In various embodiments, the security device includes a sensing mechanism coupled to the engagement component for automatically detecting when the force-limiting mechanism limits a locking force of the locking mechanism. According to one embodiment, in response to the force-limiting mechanism limiting the locking force, the sensing mechanism performs one or more predetermined actions, including but not limited to automatically causing the engagement component to disengage (e.g., thereby disabling the locking mechanism), and causing generation and/or transmission of an indication, such as a light, sound, or electronic communication, to indicate the state of the security device.

Exemplary Embodiments

Referring now to the figures, for the purposes of example and explanation of the fundamental processes and components of the disclosed systems and processes, reference is made to FIG. 1, which illustrates an exemplary, security device 100 according to one embodiment of the present disclosure. As will be understood and appreciated, the exemplary security device 100 shown in FIG. 1 represents merely one approach or embodiment of the present system, and other aspects are used according to various embodiments of the present system.

FIG. 1A shows a security device 100 that is affixable to or attachable to a target site 102. Non-limiting examples of the target site 102 include, but are not limited to, cup holders, vehicle doors, vehicle compartments (e.g., trunk, glovebox, seat pockets, etc.), seats, seatbacks, seat belts, vehicle exterior, vehicle interior, vehicle doors, vehicle windows, mirrors, visors, wheels, and tires. The security device 100 can include one or more protrusions or legs that are configured to extend from the security device 100 and contact surfaces of the target site 102, thereby securing the position of the security device 100. The security device 100 can include a locking mechanism that actuates the legs 104 to secure or release the security device 100 at the target site 102.

The security device 100 can include a body 103 that includes a first portion 105 and a second portion 107 among other potential portions. The body 103 can include a generally cylindrical shape or another suitable polyhedron. The body 103 can be shaped to substantially conform to the target site 102. The first portion 105 can be rotated about the second portion 107 in two directions (referred to as first and second directions). As further described with reference to FIG. 1B, the rotation of the first portion 105 relative to the second portion 107 in a first direction can secure the security device 100 to a target site 102, for example, by causing a locking mechanism to engage and lock the position of the security device 100. The rotation of the first portion 105 relative to the second portion 107 in a second direction can unsecure the security device 100 to the target site 102, for example, by causing the locking mechanism to disengage and retract the legs of the security device 100. The security device 100 can include an indicator 109 that indicates a current state of the security device 100 (e.g., an unarmed state, an armed state, a special mode, etc.) as well as a current state of the locking mechanism (e.g. unlocked and disengaged, unlocked and engaged state, locked and disengaged state, or locked and engaged state). Non-limiting examples of the indicator 109 include, but are not limited to, audio output sources, such as speakers, and light sources, such as a light ring and light-emitting diodes.

In one example, to secure the security device 100 to the target site 102, the first portion 105 rotates in a first direction about the second portion 107, the rotation in the first direction causing the legs 104A, 104B to extend and contact walls of the target site 102. In this example, the rotation of the first portion 105 in the first direction causes an indicator 109 to activate and emit a colored light (e.g., a green light or other color), thereby indicating the locked state of the security device 100. In the same example, to release the security device 100 from the target site 102, the first portion 105 rotates about the second portion 107 in a second direction (e.g., opposite the first direction), the rotation in the second direction causing the legs 104 to retract from the walls of the target site 102. In this example, the rotation of the first portion 105 in the second direction causes the indicator 109 to deactivate, emit a light of a particular color (e.g., green or another color, such as red), and/or emit light at a particular frequency or pattern. The pattern and/or color can be different from other colors or patterns used by the security device 100 to indicate the rotation of the first portion 105 in the second direction to a user. In another example, rotation of the first portion in either the first direction or the second direction causes the indicator 109 to generate and emit a prerecorded sound, such as a "click." The sound for rotation in the first direction may differ from a sound used for rotation in the second direction. The security device 100 may include one or more haptic or tactile feedback mechanisms. As an example, the feedback mechanism may apply a force, generate a vibration or cause another motion to be conveyed to a user.

Figure 1B:
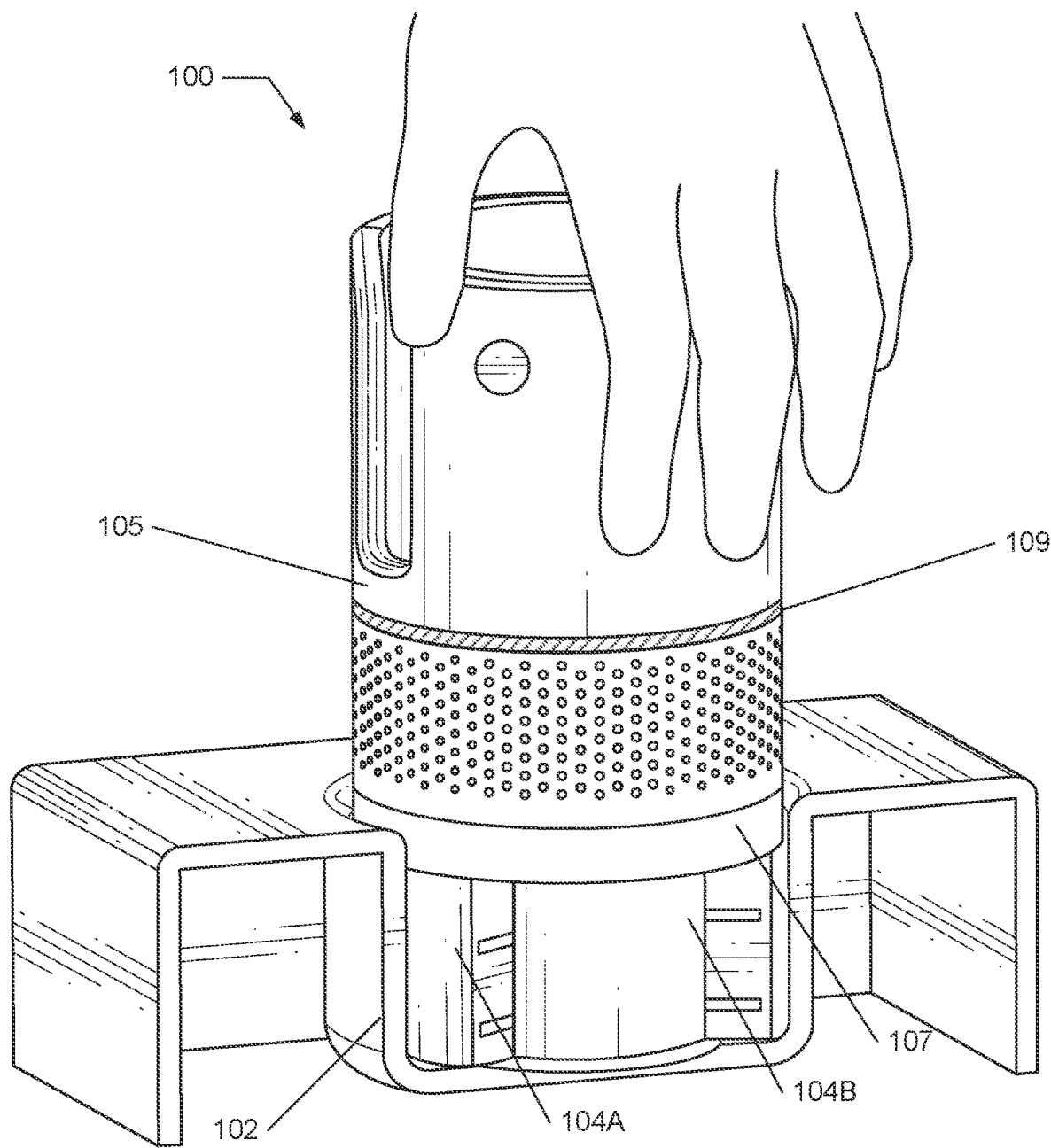
FIG. 1B also illustrates exemplary security devices, according to one embodiment of the present disclosure

FIG. 1B shows a security device 100 that is secured within a target site 102. As compared to the embodiment of the security device 100 shown in FIG. 1A, the first portion 105 is rotated in a first direction about the second portion 107. The rotation of the first portion 105 in the first direction can cause the legs 104A, 104B to extend outward and contact the target site 102, thereby securing the position of the security device 100. Once the legs 104A, 104B contact the target site 102, further rotation applies a force on the target site 102 based on a rotational force applied to the first portion in the first direction. In some embodiments, when that rotational force in the first direction exceeds a predefined threshold, a force-limiting mechanism can limit the force to prevent damage to the target site 102. Moreover, a sensing mechanism can detect that the force-limiting mechanisms limited the force (e.g., that the clutch slipped). Once detected, the security device 100 can indicate that the security device 100 is secured at the target site 102. The indicator 109 can generate an output (e.g., a sound, light, vibration, or other output) that indicates the status of the security device 100.

In some embodiments, the security device 100 can generate escalating indications as to the security of the device 100 at the target site 102. For example, the sensing mechanism determines that the force-limiting mechanism causes a first slip and, in response, the indicator 109 emits a colored light. In the same example, following activation of the indicator 109, the sensing mechanism detects a second slip and, in response, the indicator 109 (or other device element) escalates the alert process by emitting an audible notification. Continuing the example, the sensing mechanism detects a third slip and the alert process is further escalated by the security device 100 transmitting an alert to a mobile computing device (e.g., a smartphone) that indicates the secured state of the security device 100. In one embodiment, the indications as to the security of the device 100 at the target site 102 can be based on profile information associated with a current user. As an example, the indication may be a visual indicator if a profile indicates a current user is deaf, while the indicator may be an auditory indicator if the profile indicates that a person is color blind.

In at least one embodiment, to indicate that a force-limiting mechanism has limited a locking force, the feedback mechanism may generate a rotation of the first portion 105, for example, in a direction opposite the rotation of a force applied by a user to the first portion 105. In other words, the feedback mechanism can apply a counter-torque in response to the sensing mechanism detecting that a user attempts to increase the locking force beyond a predetermined threshold controlled by the force-limiting mechanism. The counter-torque may be a single pulse of force in an opposite direction to provide feedback to the user not to turn the locking mechanism further. In one example, the counter-torque may include two or more pulses of force, such as, for example if the user continues rotating the locking mechanism. A set number of pulses may be used to convey information. As an example, two pulses (or another number) may be used to indicate an error condition. The duration of the pulses may also be used to convey information. The feedback mechanism may generate a longer pulse for each after a threshold number of slips.

In an exemplary scenario, a user rotates the first portion 105 in a first direction about the second portion 107 to engage a locking mechanism. The sensing mechanism detects that the force-limiting mechanism caused the first portion 105 to slip with respect to the second portion 107, thereby limiting a locking force of the locking mechanism. In response to detecting the slip of the first portion 105, an indicator 109 emits a colored light. The sensing mechanism detects that the force-limiting mechanism prevents a locking force for a second time, thereby causing the first portion 105 to slip once more. In response to detecting the second slip, a feedback mechanism applies a rotational force to the first portion 105 in a second direction, opposite the first direction, such that the user is alerted that further rotation of the first portion 105 in the first direction is not a valid action (e.g., as the locking mechanism cannot be further engaged).

Figure 2:
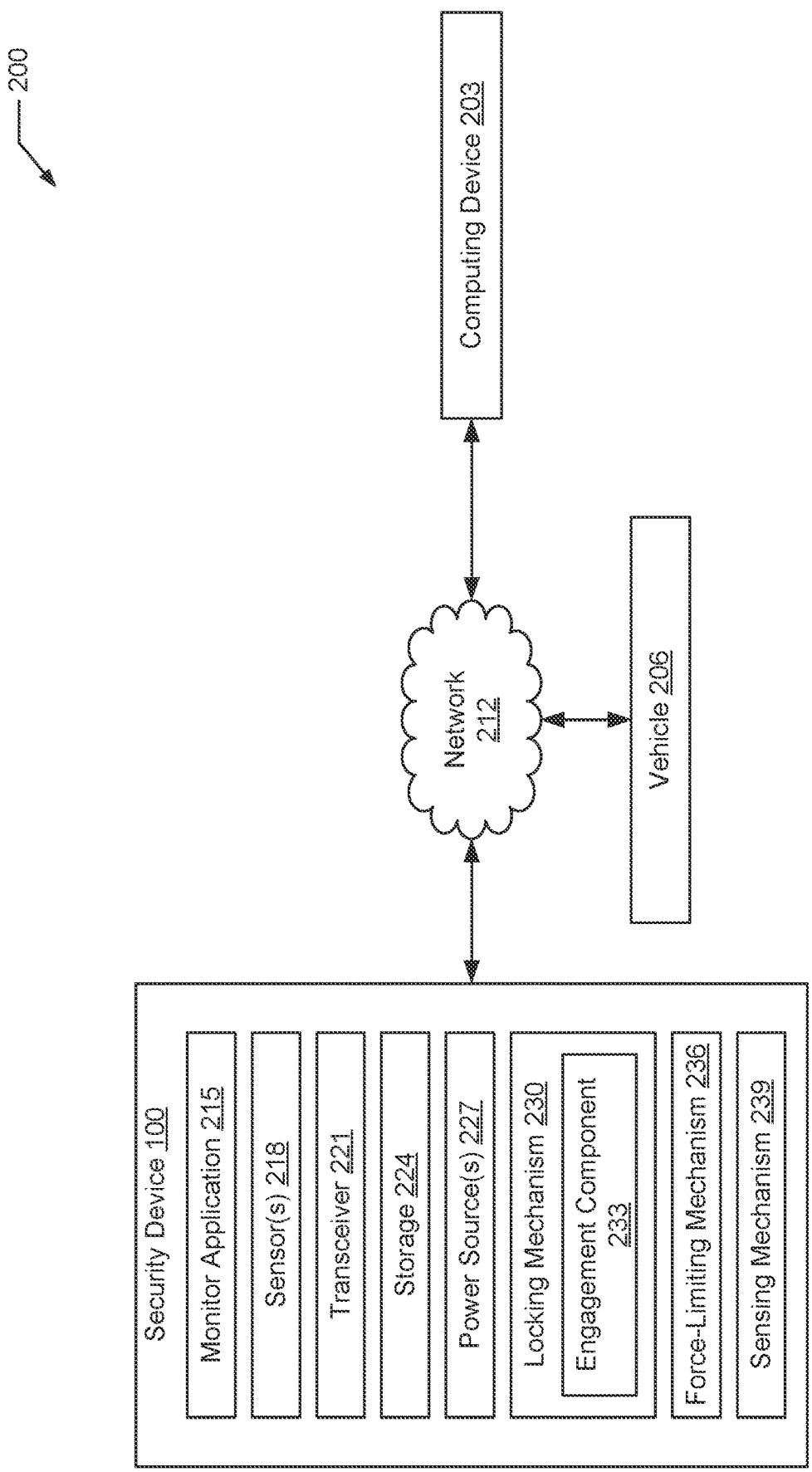
FIG. 2 illustrates an exemplary monitoring system, according to one embodiment of the present disclosure.

FIG. 2 shows an exemplary networked environment 200. As will be understood and appreciated, the networked environment 200 shown in FIG. 2 represents merely one approach or embodiment of the present system, and other aspects are used according to various embodiments of the present system. The networked environment 200 includes one or more security devices 100, a computing device 203, and a vehicle 206 in communication via a network 212. The security device 100 can be secured to or within the vehicle 206 (e.g., for example, to a door or within a cup holder of the vehicle 206). The security device 100 can include a monitor application 215, one or more sensors 218, one or more transceivers 221, one or more storage devices 224, one or more power sources 227, one or more locking mechanisms 230, one or more force-limiting mechanisms 236, and one or more sensing mechanisms 239. The security device 100 can include a circuit board with an embedded computing device or system-on-a-chip (SOC) architecture.

The computing device 203 can include, but is not limited to, a computing environment (e.g., a local computing environment and/or a remote computing environment) or a mobile computing device, such as a smartphone, tablet, smart accessory, laptop, or key fob. The computing device 203 can include a software application for communicating with and controlling the security device 100. In some embodiments, installing the security device 100 includes downloading the software application onto the computing device 203, for example, from a remote server. The computing device 203 can generate user interfaces for viewing and controlling various aspects of the security device 100, such as, for example, the enabled or disabled state of the locking mechanism 230. The computing device 203 can receive selections or other inputs from a user via the user interfaces and, thereby, allow the user to control the security device 100. In one example, in response to a sensing mechanism detecting that the security device 100 is secured to a target site via a locking mechanism 230, the computing device 203 automatically generates a notification alerting a user to the locked state of the security device 100. In the same example, the computing device 203 generates a user interface for receiving a confirmation to disable the locking mechanism 230. Continuing the example, the computing device 203 receives a selection for confirming the disabling of the locking mechanism 230, and, in response, the computing device 203 transmits a command to the security device 100 to disable the locking mechanism 230 (e.g., for example, via a locking process 500 shown in FIG. 5).

In a similar example, the computing device 203 serves the confirmation user interface and determines that a predetermined time period (e.g., 3 seconds, 10 seconds, 1 minute, etc.) has passed without receiving a selection or other input. In this example, in response to determining the predetermined time period has elapsed, the computing device 203 automatically transmits a command to disable the locking mechanism 230 (e.g., to ensure potential theft of the security device 100 is avoided). In the same example, the computing device 203 receives, via a user interface, a selection to enable the locking mechanism 230 (e.g., to allow a user to retrieve the security device 100 from a target site) and transmits a command to the security device 100 to enable the locking mechanism 230.

The security device 100 can include a computing device with a processor and memory to execute the monitoring application 215. The monitor application 215 can be executed by a processor of the security device 100 to receive measurements from the sensors 218, which can be stored in the storage device 224. The monitor application 215 can send the measurements from the storage device 224 to the computing device 203 via the network 212 using the transceiver 221. The network 212 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks.

The monitoring application 215 can read or receive measurements from each of the sensors 218. Based on the measurements, the monitor application 215 can determine whether an event has taken place. Non-limiting examples of events include but are not limited to intrusions, vandalism, material harm, and aggressive or unlawful operation of the vehicle 206. The one or more sensors 218 can include, but are not limited to, ultrasonic sensors, passive infrared (PIR) sensors, radar sensors, pressure sensors, temperature sensors, carbon monoxide sensors, carbon dioxide sensors, video sensors, audio sensors, vibration sensors, and other sensors. In some embodiments, one or more sensors 218 may correspond to one or more electrical components in communication with the monitor application 215 via one or more general purpose input and output pins of the computing device. The one or more sensors 218 may be optoisolated from the computing device to prevent electrical signals from damaging the computing device.

The monitor application 215 may generate a signal, such as an RS232 signal, an RS485 signal, an I2C signal, or other signal, to communicate with, read from, or configure the sensor 218. The sensor 218 may include an onboard memory with configuration options to store the configuration from the monitor application 215. In other embodiments, the sensor 218 may be configured based on an input voltage at one or more pins, and the monitoring application 215 can control the output voltage (e.g., via a digital to analog converter, through pulse width modulation, or similar control) on the one or more pins to configure the sensor 218. In another embodiment, the sensor 218 may be configured based on a resistance between two or more pins, and the monitoring application 215 can adjust a variable resistance to configure the sensor 218.

The monitor application 215 can perform various processes and actions for supporting functions of the security device 100, including but not limited to communicating with the computing device 203, processing sensor readings, analyzing sensor readings, and, based on the analyses, determining if an event has occurred. The monitor application 215 can initiate configuration changes of the security device 100 and sensor 218 (e.g., such as changes between armed and disarmed states, between various modes, etc.). In one example, in response to receiving an electrical signal from a sensing mechanism, the monitor application 215 disables the locking mechanism 230 by causing an engaging component thereof to mechanically decouple a first portion of the security device from the second portion.

The monitor application 215 can enable or disable the transceiver 221. The transceiver 221 can communicate with the network 212 via an internet connection. The internet connection can correspond to a cellular data connection, a satellite data connection, a WiFi connection, or some other connection. In one embodiment, the security device 100 can connect to a WiFi network provided by the vehicle 206. In another embodiment, the security device 100 can use a transceiver 221 to access or provide a cellular or satellite data connection, and the security device 100 can use a second transceiver 221 to provide a WiFi hotspot in the vehicle 206. The monitor application 215 and/or computing device 203 may utilize the WiFi hotspot to access the internet via the transceiver 221.

The transceiver 221 can be configured for sending and receiving data via the network 212. The monitor application 215, via the transceiver 221, can transmit and receive various commands from the computing device 203 and/or the vehicle 206. In response to commands received at the transceiver 221, various behaviors and parameters of the security device 100 (or components connected thereto) can be changed. For example, the monitor application 215 can receive a command instructing the security device 100 to disable the locking mechanism 230. In response to receiving the command, the monitor application 215 can automatically cause the locking mechanism 230 to be disabled (e.g., via a locking process 500 shown in FIG. 5). As another example, the monitor application 215 can receive a request for sensor readings from the sensor 218. In this example, in response to receiving the request, the monitor application 215 can retrieve and transmit data comprising the sensor readings to the computing device 203 or to a particular destination provided in the request.

The storage 224 can provide data storage for interim data being used by the monitor application 215, such as historical sensor measurements including video and audio data among other data. The monitor application 215 may store and maintain one or more sensor data buffers on the storage 224 with a configured amount of sensor history. As an example, the storage 224 may include a timestamped log of historical (dis)engagements of the locking mechanism 230 or engagement component thereof, or of determinations that a force-limiting mechanism has limited a locking force of the locking mechanism 230. When an unauthorized event is detected, the monitor application 215 may capture and store sensor data (e.g., video, audio, or other sensor data) during the unauthorized event. The monitor application 215 may copy or otherwise initialize the sensor data for the unauthorized event with a portion or all of the sensor data buffers. The monitor application 215 may transmit the stored sensor data to the computing device 203, either in real-time or in segments according to predetermined criteria. In some embodiments, the storage 224 includes information associated with one or more user accounts registered with the security device 100. For example, the storage 224 can include lists of contacts, payment processing information, addresses, and other data.

The power source 227 can include a battery, a capacitor, a DC power source, an AC power source, another power source, or a combination thereof. As an example, the security device 100 may have a battery mounted inside of a case to provide power to circuitry and sensors 218 included therein. As another example, the security device 100 may receive power from a vehicle, such as from a cigarette lighter, a power outlet, a USB port, an OBD port, a wireless charging connection, or through another connection. In one example, the vehicle may include a wireless power source 227 (e.g., a QI or other inductive charger) in a cup holder or another location, and the security device 100 can receive electrical energy from the wireless charger. The security device 100 may store the electrical energy in an onboard battery or other onboard power source 227. In one embodiment, the security device 100 can determine that a power level is low in the power source 227. When the power level is low, the security device 100 may initial one or more low power safety measures, such as disabling the engagement component 233, backing up a memory device, synching with a flash storage device, or some other safety measurement. When power is restored, the security device 100 may reconfigure itself according to stored settings when the low power safety measures were activated. For example, the engagement component 233 may be set back to enabled if it was disabled due to low power.

The security device 100 can be mounted into the vehicle 206 to provide a user of the vehicle 206 with monitoring and notification when a malicious party interacts with the vehicle 206. The security device 100 can be secured into the vehicle 206 via the locking mechanism 230 to prevent the malicious party from being able to remove or disable the security device 100 during an unauthorized interaction with the vehicle 206, e.g., a break-in event. In one embodiment, the security device 100 has a form factor that fits within a cup holder of the vehicle 206. A body of the security device 100 can include a first portion and a second portion that can be rotated relative to one another. The locking mechanism 230 may engage when the first portion rotates relative to the second portion in a first direction and disengage when the first portion rotates relative to the second portion in a second direction. The first direction may be opposite the second direction. In one example, rotating the first portion relative to the second portion causes one or more legs to extend from the security device 100 and contact walls of a target site.

The locking mechanism 230 can include an engagement component 233 that enables and disables the locking mechanism 230. To enable and disable the locking mechanism 230, the engagement component 233 can mechanically couple and decouple a first portion of the security device 100 (e.g., a first portion 105 as shown in FIG. 1) from one or more legs (e.g., one or more legs 104 as shown in FIG. 1) or some other form of protrusion. In one example, to enable the locking mechanism 230 the engagement component 233 mechanically couples the first portion and the legs such that rotation of the first portion in a first direction causes an extension of the legs and rotation of the first portion in a second direction causes a retraction of the legs. In the same example, to disable the locking mechanism 230, the engagement component 233 decouples the first portion from the legs such that rotation of the first portion does not affect the legs.

The engagement component 233 can include a cam that rotates between a first position and a second position to mechanically couple and decouple the first portion of the security device 100 from the legs. The engagement component 233 can include a motor unit, such as a servo, for rotating the cam between the first position and the second position. The monitor application 215 and computing device 203 can control the engagement component 233, for example, by transmitting commands to activate or deactivate the motor unit. The monitor application 215 and computing device 203 can determine a state of the engagement component 233 and, thereby, a state of the locking mechanism 230 by detecting a position of the cam, detecting a position of a motor unit that rotates the cam, and/or by recording one or more previous states of the engagement component 233 in memory (e.g., of a computing device of the security device 100 or of the computing device 203). In one embodiment, the cam is controlled by a circuit that automatically disengages the engagement component 233 when a sensing mechanism 239 detects that the force-limiting mechanism 236 has limited a force of the locking mechanism 230.

In one example, the monitor application 215 reads and analyzes a current position of a motor unit and, based on the analysis, determines that a cam attached to the motor unit is in a first position. In this example, based on the determination, the monitor application 215 determines that the engagement component 233 is enabled and, therefore, the locking mechanism 230, is enabled. In another example, the computing device 203 retrieves a last state of the engagement component 233 from memory and determines that the last state of the engagement component 233 includes the cam rotated to a second position. In this example, based on the second position of the cam, the computing device 203 determines that the engagement component 233 is disabled and, therefore, the locking mechanism 230 is enabled.

The monitor application 215 and the computing device 203 can enable and disable the locking mechanism 230 by enabling and disabling the engagement component 233. In one example, the computing device 203 includes a software application for controlling the security device 100, and the software application transmits a command to the security device 100, the command including instructions to disable the locking mechanism 230. In this example, in response to receiving the command, the monitor application 215 transmits a signal to the engagement component 233 that causes a cam to be rotated from a first position to a second position, thereby disengaging the engagement component 233 and disabling the locking mechanism 230.

The force-limiting mechanism 236 can receive a portion of the engagement component 233, such as one or more pins, for mechanically coupling a first portion of the security device 100 to one or more legs or protrusions. While the engagement component 233 is enabled, the force-limiting mechanism 236 can rotate in response to rotation of the first portion of the security device 100, the rotation of the force-limiting mechanism 236 causing the one or more legs to extend or retract (e.g., depending on rotational direction). The force-limiting mechanism 236 can limit a locking force of the locking mechanism 230 to a predetermined magnitude, for example, by causing the first portion to slip relative to the force-limiting mechanism 236 when the first portion applies a force that meets a predetermined threshold.

In an exemplary scenario, the force-limiting mechanism 236 includes two or more discs or plates configured to rotate about a vertical axis, the two disks forming a clutch mechanism. A spring-loaded retention mechanism (e.g., a ball bearing, protrusion, substantially spherical object, inclined plane, or other object, which are collectively referred to as a "ball" herein and may or may not be free to rotate) is positioned between the two discs. The first disk is connected to first portion of the security device 100 such that rotation of the first portion causes rotation of a first disk. The ball couples to a driving pin that passes through an aperture in the first disc. Meanwhile, the second disk includes a track for the ball to travel along as the first disk is rotated relative to the second disc. The track includes a circular shape with a distance to the center of the track from the center of the disk being equal at all points. The track includes one or more protrusions blocking the track. The protrusions each include two inclined planes, with a first inclined plane facing a first direction and a second inclined plane facing a second direction opposite the first direction. The first inclined plane contacts the ball when the first disk rotates relative to the second disk in one direction. Similarly, the second inclined plane contacts the ball when the first disk rotates relative to the second disk in another direction.

In the same scenario, when the ball contacts the inclined plane (either the first inclined plane or the second inclined plane), the turning force (also referred to as a rotational force or torque) translates into both a vertical and a horizontal component according to an angle of the inclined plane. The vertical component of force is opposed by or push against the spring force that holds the ball in place. When the vertical component meets or exceeds the force of the spring, the ball travels up and over the inclined plane, thereby causing the first disk to "slip" past the second disk and thus limiting a force of the locking mechanism 230.

The sensing mechanism 239 can detect when the force-limiting mechanism 236 has limited a force of the locking mechanism 230. For example, the sensing mechanism includes one or more disconnected electrical circuits that are completed upon the force-limiting mechanism 236 limiting a locking force of the locking mechanism 230. In an exemplary scenario, the first portion of the security device rotates from a first position to a second position, thereby causing the locking mechanism 230 to extend one or more legs via an engaged force-limiting mechanism 236. The one or more legs extend and contact walls of a target site, and further rotation of the first portion results in additional force being applied to the force-limiting mechanism in excess of a predetermined threshold. The additional force causes the force-limiting mechanism 236 to limit the locking force to the predetermined threshold by causing the first portion to slip relative to the second portion (e.g., a first disk slips relative to a second disk, as outlined above). The slip of the first portion relative to the second portion sensing mechanism 239 completes an electrical circuit and, in response, the sensing mechanism 239 receives an electrical signal. Based on the electrical signal, the sensing mechanism 239 determines that the slip occurred and, thus, the force-limiting mechanism 236 has limited the locking force of the locking mechanism 230. As an example, the sensing mechanism 239 can receive an electrical input (e.g., via a general purpose input/output (GPIO) pin or other electrical pin) when the slip occurs. It will be understood and appreciated that the force-limiting mechanism 236 can limit a locking force of the locking mechanism 230 during engaging or disengaging of the locking mechanism 230 (e.g., via rotation of the first portion of the security device 100 from a second position to a first position). It will be further understood and appreciated that the sensing mechanism 239 can detect said limiting of the locking force in lock-engaging and lock-disengaging scenarios.

The sensing mechanism 239, monitor application 215, and/or computing device 203 can perform a variety of actions in response to a determination that the force-limiting mechanism 236 has limited a locking force of the locking mechanism 230. The variety of actions can include but are not limited to automatically disabling the locking mechanism 230 by disengaging the engagement component 233, transmitting one or more electronic communications, activating an indicator, such as a light, audio, or haptic feedback source, and generating user interfaces for controlling the security device 100.

In an exemplary scenario, the monitor application 215 receives or reads a signal from the sensing mechanism 239 that indicates the force-limiting mechanism 236 has limited a locking force of the locking mechanism 230. In response to the signal, the monitor application configures the transceiver 221 from a depowered to a powered state and transmits a second signal to the computing device 203, the second signal indicating that a locking force has been limited (e.g., a slip occurred) and/or that the locking mechanism 230 is fully engaged or fully disengaged. In response to the second signal, the computing device 203 generates a notification, such as a popup alert, push alert, etc., to notify a user that the locking mechanism 230 is fully engaged or disengaged, or that the security device 100 is fully secured to or fully de-secured from a target site. Alternatively, or in addition, the computing device 203 generates a user interface including a selectable option for disabling the locking mechanism 230. The computing device 203 receives a selection to disable the locking mechanism 230 and transmits a command to the security device 100 to disable the locking mechanism 230. In response to the command, the monitor application 215 transmits a signal to the engagement component 233 that causes the engagement component 233 to disable the locking mechanism 230 (e.g., by rotating a cam from a first position to a second position and, thereby, mechanically decouple a first portion of the security device 100 from one or more legs).

In the same scenario, the computing device 203 generates a second user interface for controlling the security device 100. The computing device 203 can generate the user interface in response to input from a user or in response to one or more determinations, such as, for example, determining a predetermined time period has lapsed following disablement of the locking mechanism 230 or determining that a location of the computing device 203 is within a predetermined range (e.g., 2 feet, 3 yards, etc.) of the security device 100 or vehicle 206. Continuing the scenario, the computing device 203 receives a selection to enable the locking mechanism 230 and, in response, transmits a command to the security device 100 (e.g., to the monitor application 215). The monitor application 215 receives the command and engages the engagement component 233 to enable the locking mechanism 230 and, thereby, allow the security device 100 to be removed.

Figure 3A:
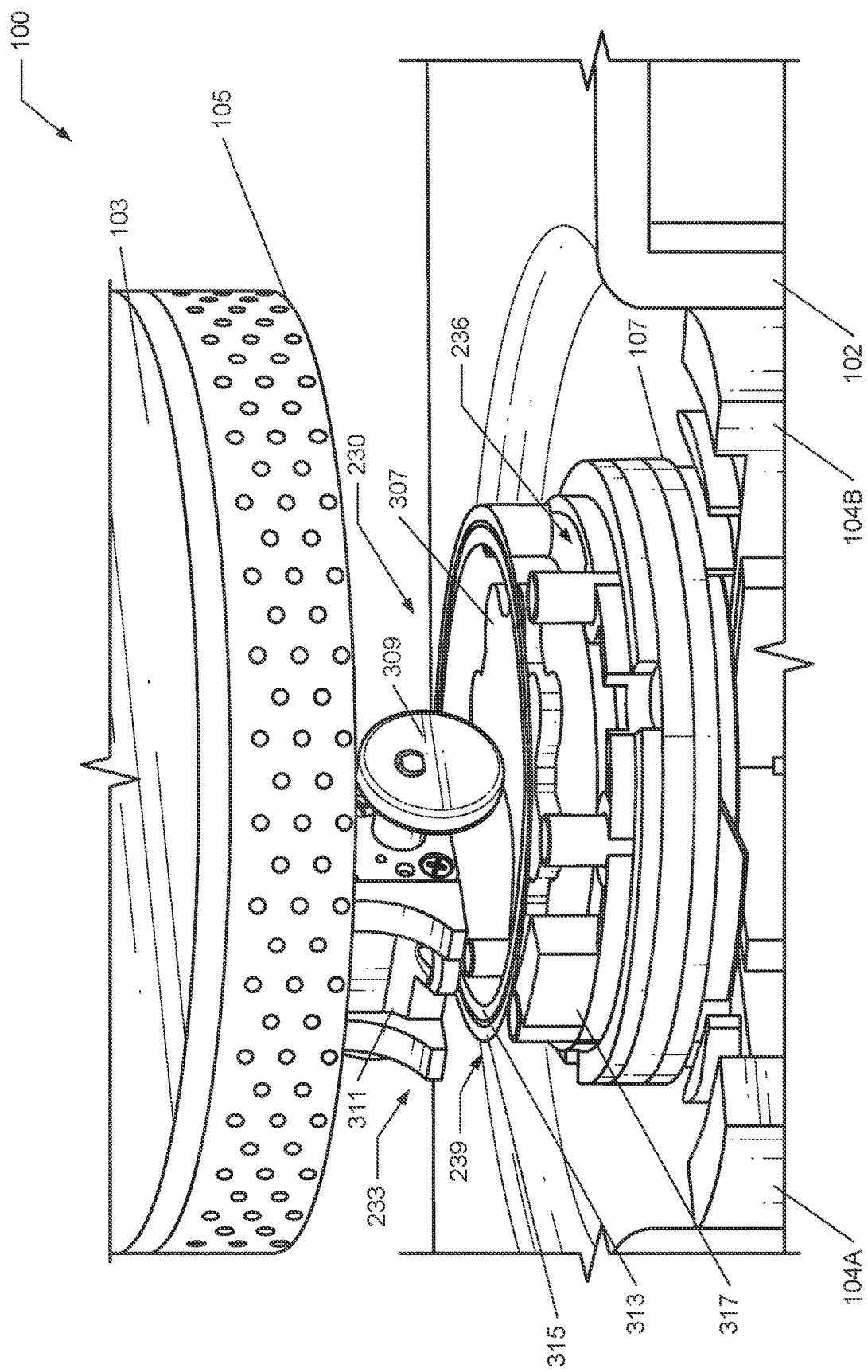
FIG. 3A shows exploded views of exemplary security devices, according to one embodiment of the present disclosure.

FIG. 3A shows an exploded view of an exemplary security device 100. The security device 100 can include a locking mechanism 230, a force-limiting mechanism 236, and one or more sensing mechanisms, such as a sensing mechanism 239 (also referred to herein as a sensing mechanism 239). The locking mechanism 230 can cause one or more legs 104A, 104B to extend in response to rotation of the first portion 105 about the second portion 107. For example, when the locking mechanism 230 is enabled, the first portion 105 is connected to the force-limiting mechanism 236 such that rotation of the first portion 105 causes corresponding rotation of the force-limiting mechanism 236. In this example, the corresponding rotation of the force-limiting mechanism 236 causes the one or more legs 104A, 104B to extend and contact a target site 102. In the same example, further rotation of the first portion 105 causes the one or more legs 104A, 104B to apply a force to the target site 102, thereby securing the position of the security device 100. Continuing the example, as the first portion 105 is further rotated, the force-limiting mechanism engages to prevent the application of additional force to the one or more legs 104A, 104B and/or target site 102 (e.g., to potentially avoid damaging the security device 100 or target site 102). In another example, when the locking mechanism 230 is disabled, the first portion 105 can be freely rotated without causing a corresponding rotation at the second portion 107 and/or an extension or retraction of the one or more legs 104A, 104B. In at least one embodiment, as further discussed with reference to FIGS. 4A-C, the force-limiting mechanism 236 includes a slip-clutch mechanism, or the like, that causes the force-limiting mechanism 236 to disengage (e.g., by "slipping") when a predetermined level of force is applied.

The locking mechanism 230 can include an engagement component 233 that controls the (dis)engagement of the locking mechanism 230. In various embodiments, the engagement component 233 includes a connection plate 307, a cam 309, and a motor unit 311. The cam 309 can rotate between a first position (e.g., referred to as a "raised" state) and a second position (e.g., referred to as a "lowered" state) to lower the connection plate 307 into the second portion 107. In the lowered state, the connection plate 307 can be received into a section of the second portion 107 (not shown) such that rotation of the first portion 105 is translated into extension or retraction of the one or more legs 104A, 104B. In some embodiments, the connection plate 307 includes one or more pins (not shown) and the second portion 107 (e.g., in some embodiments, the force-limiting mechanism 236) includes one or more apertures (not shown) for receiving the pins. In at least one embodiment, the apertures at the second portion 107 receive the pins of the connection plate 307 to mechanically couple the first portion 105 and the one or more legs 104A, 104B (e.g., thereby enabling the locking mechanism 230). In various embodiments, to disable the locking mechanism 230, the pins of the connection plate 307 rise from the apertures to mechanically decouple the first portion 105 and the one or more legs 104A, 104B. In some embodiments, the one or more legs 104A, 104B can correspond to one or more projections, such as, for example, one or more discs that project outward upon rotation of the first portion relative to the second portion. The connection plate 307 can be spring-biased such that, when the cam 309 is in the first position, the locking mechanism 230 is not engaged (e.g., the connection plate 307 is raised from the second portion 107 such that no connection is formed between the first portion 105 and the force-limiting mechanism 236). The motor unit 311 can rotate the cam 309 to cause the connection plate 307 to transition between a first position (e.g., a raised state in which the locking mechanism 230 is disabled) and a second position (e.g., a lowered state in which the locking mechanism 230 is enabled). As shown in FIG. 3A, the motor unit 311 rotates the cam 309 to a second position and, thereby, causes the connection plate 307 to lower into the force-limiting mechanism 236, which enables the locking mechanism 230.

The sensing mechanism 239 can detect activity occurring at the force-limiting mechanism 236 (e.g., for the purposes of automatically enabling and disabling the locking mechanism 230). In some embodiments, the sensing mechanism 239 is coupled to the engagement component 233. Detections from the sensing mechanism 239 can cause the monitor application 215 (or another element of the security device 100) to enable or disable the locking mechanism 230. In one example, during rotation in a first direction, the force-limiting mechanism 236 experiences a slip, thereby indicating that the applied force reaches predetermined magnitude a predetermined magnitude (e.g., a maximum force). In this example, the sensing mechanism 239 detects the slip and, in response, transmits a signal to the monitor application 215. In the same example, the monitor application 215 causes the motor unit 311 to rotate the cam 309 to a raised position, thereby causing the connection plate 307 to raise from the force-limiting mechanism 236 and thus disabling the locking mechanism 230.

The sensing mechanism 239 can include an electrical circuit that is completed upon the force-limiting mechanism 236 experiencing a force of a predetermined magnitude. In at least one embodiment, the sensing mechanism 239 includes, but is not limited to a first circuit section 313 and a second circuit section 315. The first circuit section 313 and/or the second circuit section 315 can include a substantially ring-like shape. The first circuit section 313 and the second circuit section 315 can include conductive materials such that, when conductively bridge, the first circuit section 313 and second circuit section 315 form a closed electrical circuit. The first circuit section 313 or second circuit section 315 can be connected to an electrical source, such as a current or voltage generator supplied via the power supply 227. In response to the formation of a closed electrical circuit between the first circuit section 313 and the second circuit section 315, the sensing mechanism 239 can determine that the force-limiting mechanism 236 has limited the locking force of the locking mechanism 230. In one example, the force-limiting mechanism 236 limits a maximum locking force by causing a slippage event in which the force-limiting mechanism 236 prevents further rotation of the first portion 105 from causing further extension of the one or more legs 104A, 104B. In this example, during the slippage event, the first circuit section 313 and the second circuit section 315 are conductively bridged, thereby causing completion of an electrical circuit that is detected by the sensing mechanism 239 (e.g., or the monitor application 215). In the same example, in response to the completion of the electrical circuit, the sensing mechanism 239 causes the engagement component 233 to disable the locking mechanism 230 (e.g., by disconnecting the connection plate from the force-limiting mechanism 236). In one embodiment, the sensing mechanism 239 includes a magnetic component coupled to the first portion 105 and a magnetic sensor coupled to the second portion 107 (or vice versa) such that the magnetic sensor can detect a change in magnetic flux when the first portion 105 rotates relative to the second portion 107 from the limiting of force by the force-limiting mechanism 236. In another embodiment, the sensing mechanism 239 includes a light sensor coupled to the first portion 105 and a light emitting component coupled to the second portion 107 (or vice versa) such that the light sensor can detect a change in light when the first portion 105 rotates relative to the second portion 107 from the limiting of force by the force-limiting mechanism 236.

In various embodiments, the monitor application 215 and/or the sensing mechanism 239 detects a degree of rotation of the first portion 105 relative to the second portion 107. In one example, the first portion 105 can be rotated between a set of predetermined positions relative to the second portion 107, and the monitor application 215 and/or sensing mechanism 239 detects the rotation of the first portion 105 to and from each predetermined position. The monitor application 215 and/or the sensing mechanism 239 can perform various actions, such as enabling and disabling the locking mechanism 230, in response to detecting a particular sequence or other pattern in the rotation of the first portion 105. The body 103 can include indicia (not shown), such as printed characters and/or colorations, that indicate the set of predetermined positions. The security device 100 can be preprogrammed with a rotation sequence or other pattern that, when achieved via rotation of the first portion 105, causes the locking mechanism 230 to be disabled. In one embodiment, the rotation sequence is included as a set of printed or electronic instructions that are provided with the security device 100 or with a software application for controlling the same. In some embodiments, the security device 100 enters a lock programming mode during which a user configures the rotation sequence. Configuring the rotation sequence can include rotating the first portion 105 in a desired pattern and storing the pattern, or can include receiving one or more pattern selections via the computing device 203 and defining the rotation sequence based on the pattern selections.

In an exemplary scenario, the body 103 includes a set of colored indicia spaced radially about the body 103 and the first portion 105 includes an indicator (e.g., a printed arrow, or the like) that indicates to which of the colored indicia the first portion 105 is rotated. The set of colored indicia include blue indicia, red indicia, yellow indicia, and green indicia such that the set of colored indicia may function similar to numbers of a combination lock. Continuing the scenario, a user rotates the first portion 105 to sequentially align the indicator with the yellow indicia, red indicia, blue indicia, and green indicia, thereby providing a rotation pattern of yellow, red, blue, green. The monitor application 215 records the rotation pattern and compares the rotation pattern to a predetermined sequence. The monitor application 215 determines that the rotation pattern matches the predetermined sequence and, in response, disables a locking mechanism 230 (e.g., by disengaging an engagement component 233). In the same scenario, the user rotates the first portion 105 to sequentially align the indicator with the green indicia, yellow indicia, blue indicia, and red indicia, thereby providing a second rotation pattern. The monitor application 215 determines that the second rotation pattern matches a second predetermined sequence and, in response, enables the locking mechanism 230 (e.g., by engaging the engagement component 233).

Figure 3B:
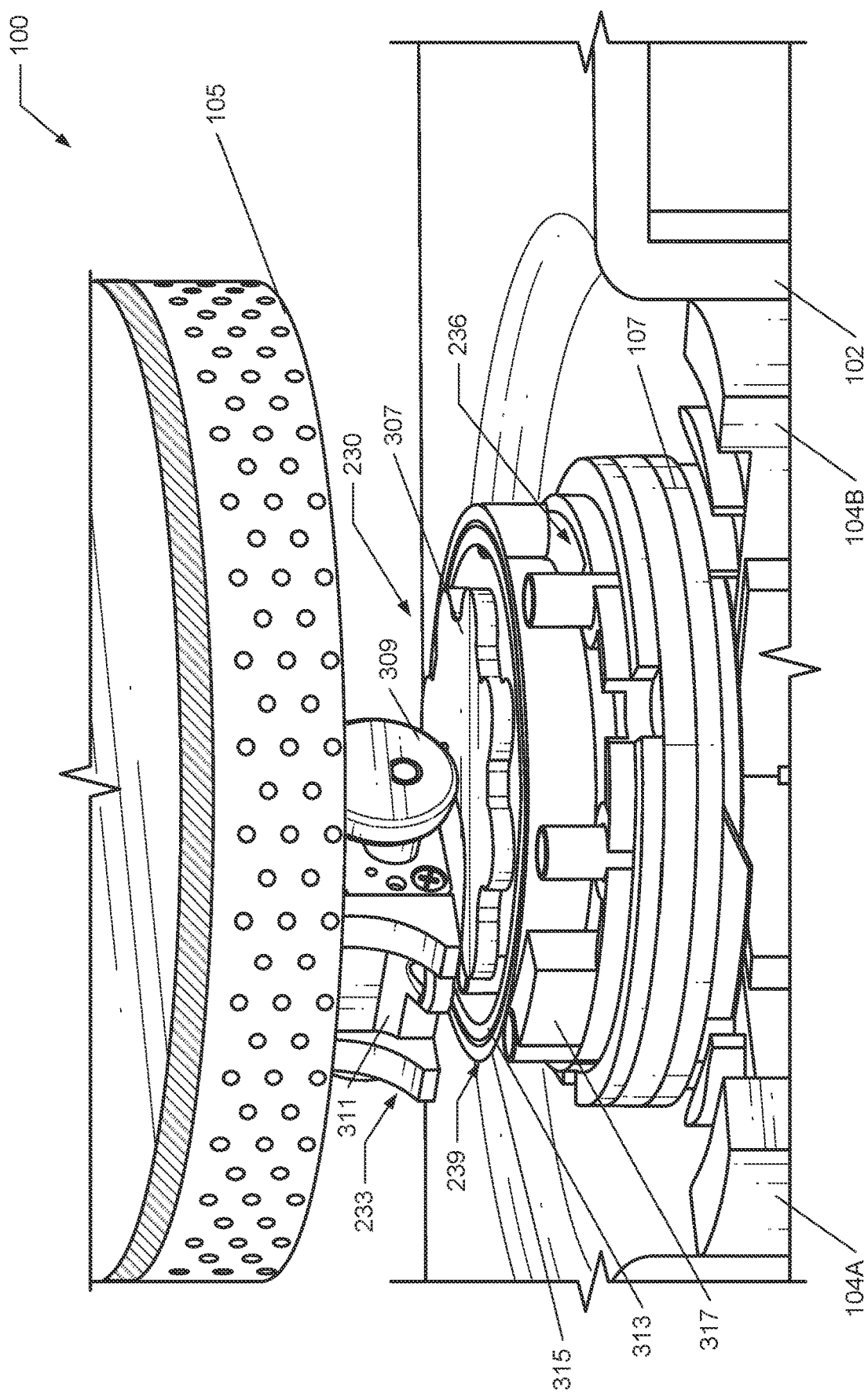
FIG. 3B also shows exploded views of exemplary security devices, according to one embodiment of the present disclosure.

FIG. 3B shows an exploded view of an exemplary security device 100. As shown in FIG. 3B, the engagement component 233 is disengaged and, in response, the locking mechanism 230 is disabled. In one example, the sensing mechanism 239 detects a closed circuit between the first circuit section 313 and the second circuit section 315, and, in response, determines that the force-limiting mechanism 236 has limited a locking force of the locking mechanism 230. In this example, the sensing mechanism 239 causes the motor unit 311 to rotate the cam 309 from a second position to a first position, thereby allowing the connection plate 307 to rise and causing disconnection of the first portion 105 from the force-limiting mechanism 236. The engagement component 233 can remain disengaged until the monitor application 215 causes engagement, for example, in response to receiving an input and/or automatically initiating a command to unlock the security device 100. In one example, the monitor application 215 receives a request to unlock the security device 100 and, in response, causes the cam 309 to rotate and lower the connection plate 307, thereby engaging the engagement component 233 and enabling the locking mechanism 230. In at least one embodiment, the sensing mechanism 239 includes a casing 317 that partially encloses additional elements of the sensing mechanism 239 (e.g., as illustrated in FIGS. 4A-C in which the casing 317 is omitted).

Figure 4A:
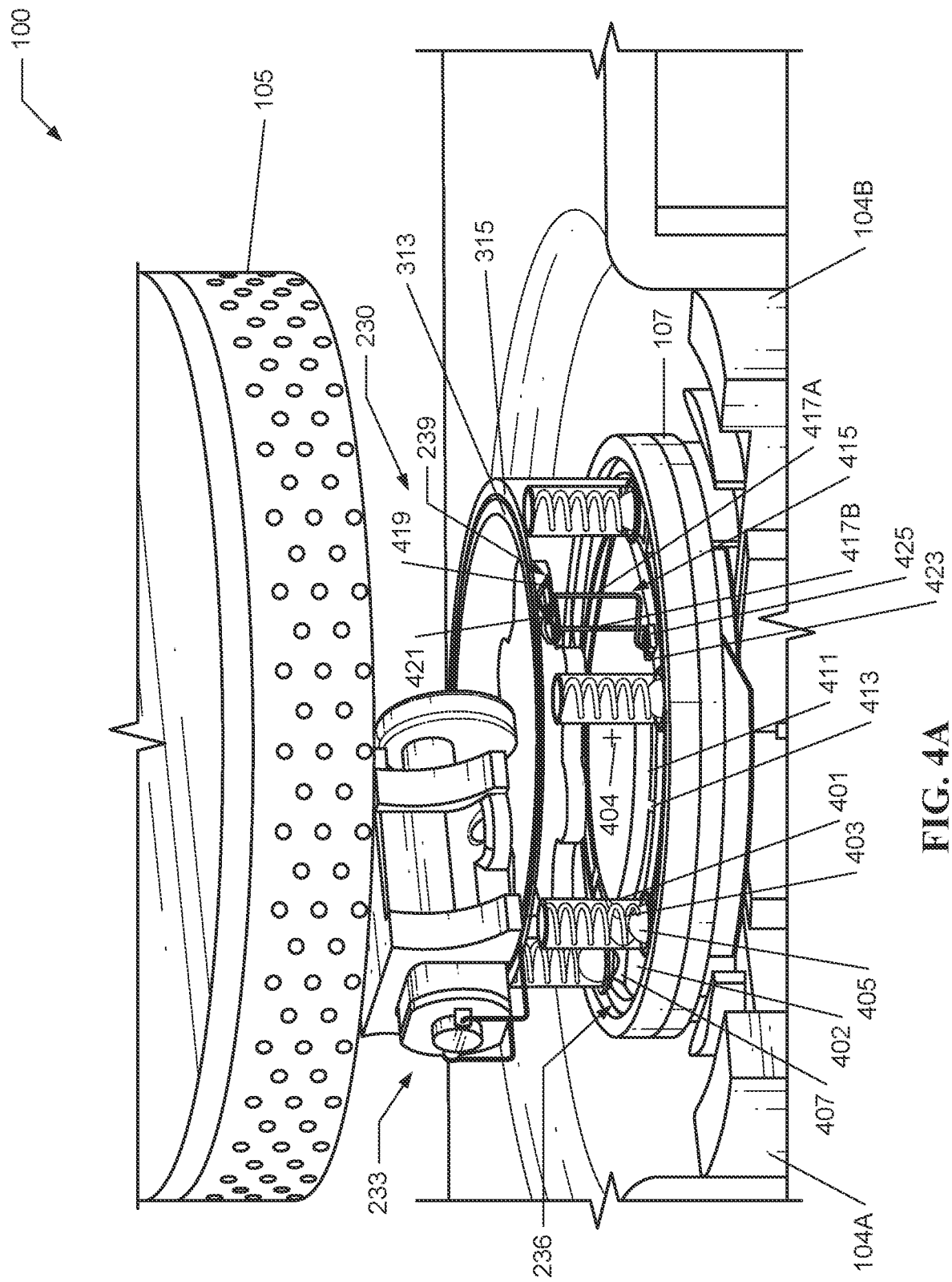
FIG. 4A shows exploded views of exemplary security devices, according to one embodiment of the present disclosure.
Figure 4B:
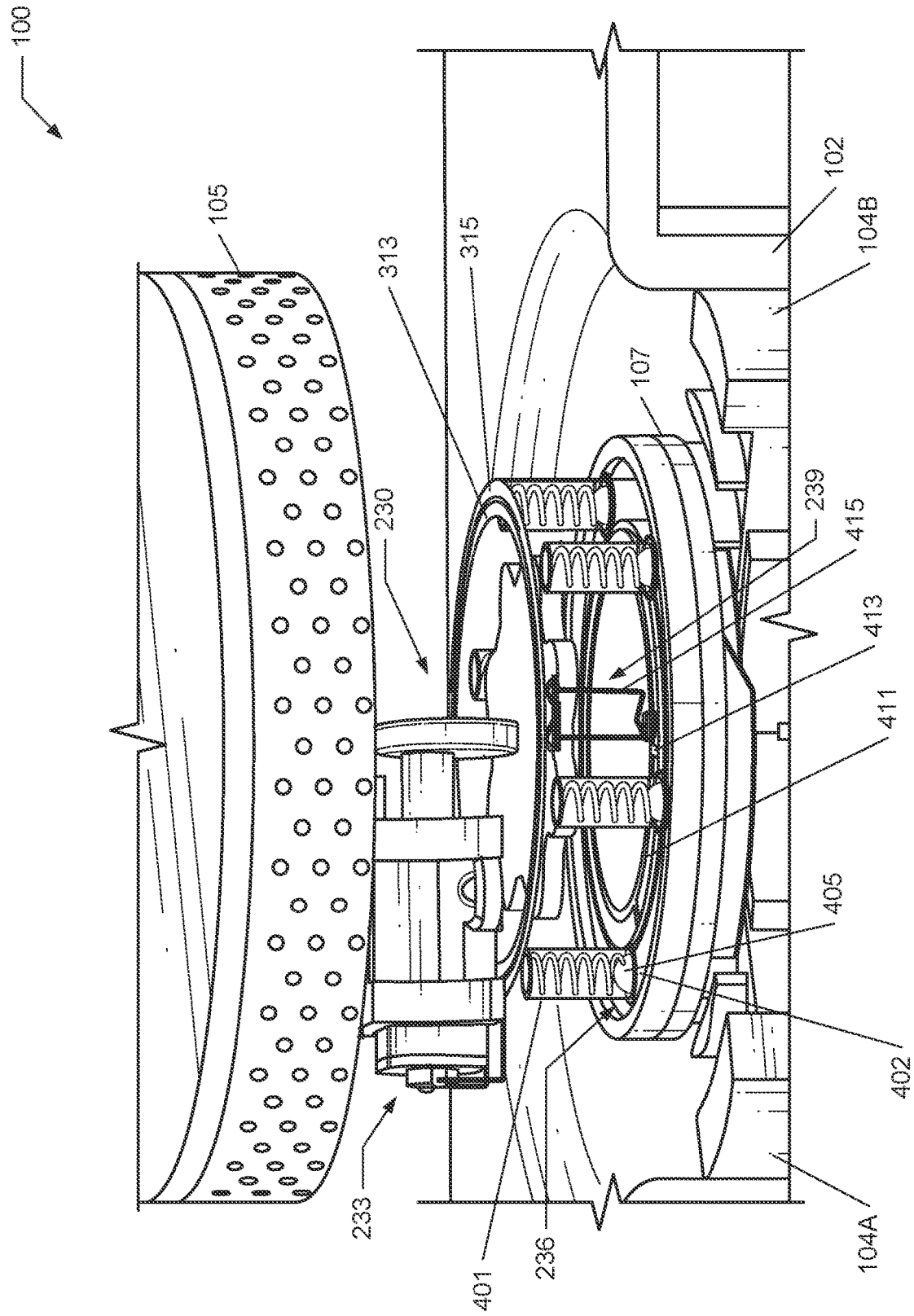
FIG. 4B also shows exploded views of exemplary security devices, according to one embodiment of the present disclosure.
Figure 4C:
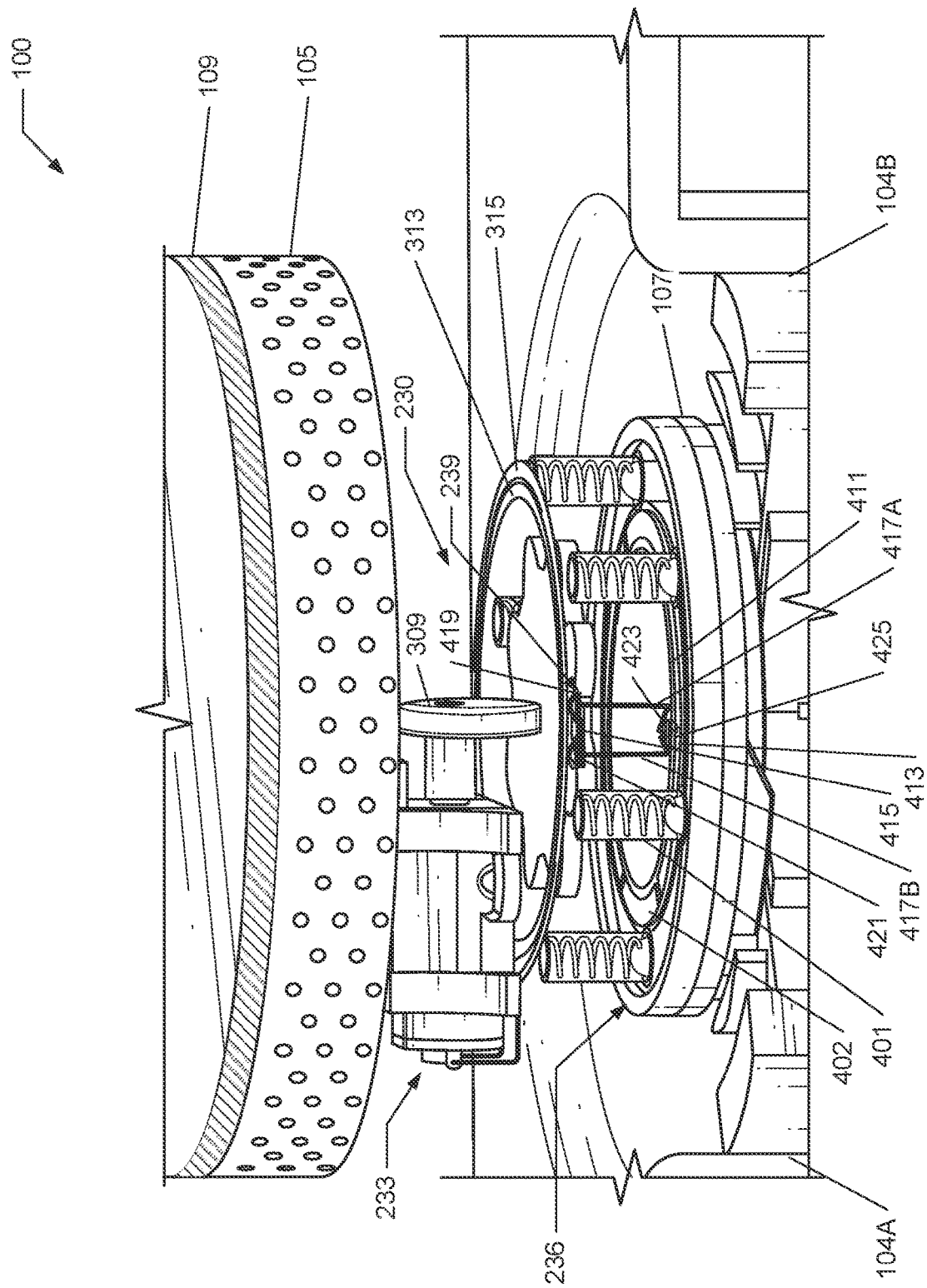
FIG. 4C also shows exploded views of exemplary security devices, according to one embodiment of the present disclosure.

FIGS. 4A-C show perspective views of an exemplary security device 100. For the purposes of illustration, portions of the exemplary security device 100, such as the casing 317 shown in FIG. 3B, are omitted in FIGS. 4A-C to permit depiction of additional elements. The following description is provided in the context of an exemplary scenario in which the security device 100 automatically disengages a locking mechanism in response to determining that a force-limiting mechanism has limited the locking force of the locking mechanism.

FIG. 4A shows a perspective view of an exemplary security device 100. The force-limiting mechanism 236 includes one or more retention mechanisms 401 positioned along a track 402 at a predetermined radius from a center 404 of the first portion 105.

Each retention mechanism 401 can include one or more springs 403 and one or more protrusions 405, and can be configured to rotate with the first portion 105. The protrusion 405 can be biased downward via the spring 403 and configured such that the protrusion 405 can retract upward into the retention mechanism 401. The protrusion 405 can include a spherical shape, such as, for example, a spherical ball or another shape including one or more constant curvatures. The track 402 can include one or more inclined planes 407 that are configured to be contacted by the protrusion 405. In response to rotation of the first portion 105, the protrusion 405 can traverse around the track 402 and contact the inclined plane 407. As the rotation of the first portion 105 proceeds, the protrusion 405 can apply a force to the inclined plane 407 that causes the force-limiting mechanism 236 to rotate and engage one or more legs 104A, 104B (e.g., a direction of the rotation corresponding to an extension or retraction thereof from a target site).

The sensing mechanism 239 can include one or more circuit portions including conductors that complete an electrical circuit when the force-limiting mechanism 236 limits the rotational force. As an example, when the force-limiting mechanism limits the rotational force, a first circuit in the first portion 105 can move relative to a second circuit of the second portion 107. The movement can cause the first circuit to electrically connect to the second circuit. The sensing mechanism 239 can detect that the first circuit electrically connected to the second circuit. In one embodiment, the sensing mechanism 239 can include the first circuit section 313, the second circuit section 315, a third circuit section 411, one or more conductors 413 conductively connected to and spaced radially around the third circuit section 411, and a connector 415 that can, under certain conditions, conductively bridge the first circuit section 313 and second circuit section 315 to form a complete electrical circuit. The third circuit section 411 can include a substantially ring-like shape. The third circuit section 411 can be such that rotation between the third circuit section 411 and the connector 415 is substantially fixed upon enablement of the locking mechanism 230 (e.g., when the security device 100 is secured to a target site 102). The connector 415 can include a first conductive protrusion 417A and a second conductive protrusion 418A. The first conductive protrusion 417A and second conductive protrusion 417B can be configured such that the protrusions do not contact each other, thereby providing a disconnected electrical circuit. In one example, the first conductive protrusion 417A and second conductive protrusion 417B are substantially parallel.

A first end 419 of the first conductive protrusion 417A can contact the first circuit section 313 and a first end 421 of the second conductive protrusion 417B can contact the second circuit section 315. The first conductive protrusion 417A and second conductive protrusion 417B can be biased (e.g., by structural design and/or via springs) to contact the first circuit section 313 and the second circuit section 315, respectively. A second end 423 of the first conductive protrusion 417A can contact the third circuit section 411 and a second end 425 of the second conductive protrusion 417B can be positioned to contact the conductor 413 (e.g., upon the sensing mechanism 239 being rotated around the third circuit section 411). The second conductive protrusion 417B can be biased to contact the third circuit section 411.

While the locking mechanism 230 is enabled, the sensing mechanism 239 can rotate along with the second portion 107 in response to rotation of the first portion 105. In one example, the locking mechanism 230 is enabled and, as the first portion 105 rotates, the sensing mechanism 239 rotates along with the first portion 105, thereby causing the connector 415 to rotate with the third circuit section 411 (e.g., as opposed to rotating around the third circuit section 411 as shown in FIGS. 4B-C). In this example, the connector 415 and third circuit section 411 rotate generally concurrently such that the connector 415 does not traverse along the third circuit section 411 and, therefore, does make not contact and avoids contact with the conductor 413.

FIG. 4B shows a perspective view of the security device 100 shown in FIG. 4A. The embodiment of the security device 100 shown in FIG. 4B may be temporally subsequent to the embodiment shown in FIG. 4A. In an exemplary scenario, as shown in FIG. 4A, the first portion 105 rotates around the second portion 107 while the locking mechanism 230 is engaged, thereby causing the retention mechanism 401 to travel along the track 402 and contact the inclined plane 407 (not shown, see FIG. 4A). As the first portion 105 further rotates, the retention mechanism 401 applies a force to the inclined plane 407 that causes rotation of the force-limiting mechanism 236 and, thereby, causes the one or more legs 104A, 104B to extend and contact a target site 102. As shown in FIG. 4B, the first portion 105 further rotates such that the retention mechanism 401 applies a force to the inclined plane 407 and, due to the contact of the one or more legs 104A, 104B with the target site 102, the applied force is opposed and causes the retention mechanism 401 to traverse upwards along the inclined plane 407. As the first portion 105 further rotates within the substantially stationary force-limiting mechanism 236, the connector 415 rotates relative to and around the third circuit section 411.

FIG. 4C shows a perspective view of the security device 100 shown in FIG. 4A. The embodiment of the security device 100 shown in FIG. 4C may be temporally subsequent to the embodiment shown in FIG. 4B. In a similar scenario to the preceding paragraph, with the one or more legs 104A, 104B contacting the target site, the first portion 105 further rotates and, thereby, causes the connector 415 to rotate along the third circuit section 411 and increases a locking force of the locking mechanism 230 (e.g., via forces applied to and by the one or more legs 104A, 104B). Once the locking force exceeds a predefined threshold of the force-limiting mechanism 236, the force-limiting mechanism can reduce or prevent the force from increasing further. As an example shown in FIG. 4C, the first portion 105 further rotates such that a protrusion 405 of the retention mechanism 401 travels upward along the inclined plane 407 (not shown, see FIG. 4A) and "slips" over the top of and past the inclined plane 407, thereby limiting the locking force of the locking mechanism 230 and acting as the force-limiting mechanism 236. As the retention mechanism 401 slips past the inclined plane 407, the connector 415 further rotates along the third circuit section 411 such that the second end 425 contacts the conductor 413. The contact between the conductor 413 and the second end 425 completes an electrical circuit between the first circuit section 313 and the second circuit section 315, thereby providing an electrical signal via the sensing mechanism 239 to sense when the force-limiting mechanism 236 limits the locking force. The electrical circuit can be completed because the conductor 413 is conductively connected to the third circuit section 411 and, thus, the contact between the conductor 413 and the second end 425 conductively bridges the first conductive protrusion 417A and the second conductive protrusion 417B, thereby conductively bridging the first circuit section 313 and the second circuit section 315.

The sensing mechanism 239 detects the electrical circuit, for example, via a voltage sensor, resistance sensor, current sensor, or other sensor, and determines that the force-limiting mechanism 236 has limited the locking force of the locking mechanism 230. The sensing mechanism 239 can provide the electrical signal from the completed electrical circuit into a general purpose input/output pin of a computing device, such as the computing device that executes the monitor application 215, to facilitate other functionality. In response to the determination, the sensing mechanism 239 can transmit an electrical signal that causes the engagement component 233 to disengage, thereby disabling the locking mechanism 230. In some embodiments, the sensing mechanism 239 can provide the signal to a computing device and the computing device can generate a signal to cause the engagement component 233 to disengage, thereby disabling the locking mechanism 230. Continuing the scenario, the electrical signal causes a motor unit 311 to rotate a cam 309 from a lowered position to a raised position, thereby allowing a connection plate 307 (not shown, SEE FIG. 3B) to disengage from the force-limiting mechanism 236 (e.g., by allowing the connection plate 307 to transition from a lowered state to a raised state such that the one or more legs 104A, 104B are mechanically decoupled from the first portion 105).

In some embodiments, in response to determining that the force-limiting mechanism 236 has limited the locking force and/or in response to disabling the locking mechanism 230, the indicator 109 activates to provide an audible, visual, tactile/haptic, or combination thereof indication of the state of the security device 100. For example, upon determining that the force-limiting mechanism has limited to the locking force, the sensing mechanism 239 (e.g., or the monitor application 215 shown in FIG. 2) causes the indicator 109 to emit an audible "click" and/or emit a visible green light.

Figure 5:
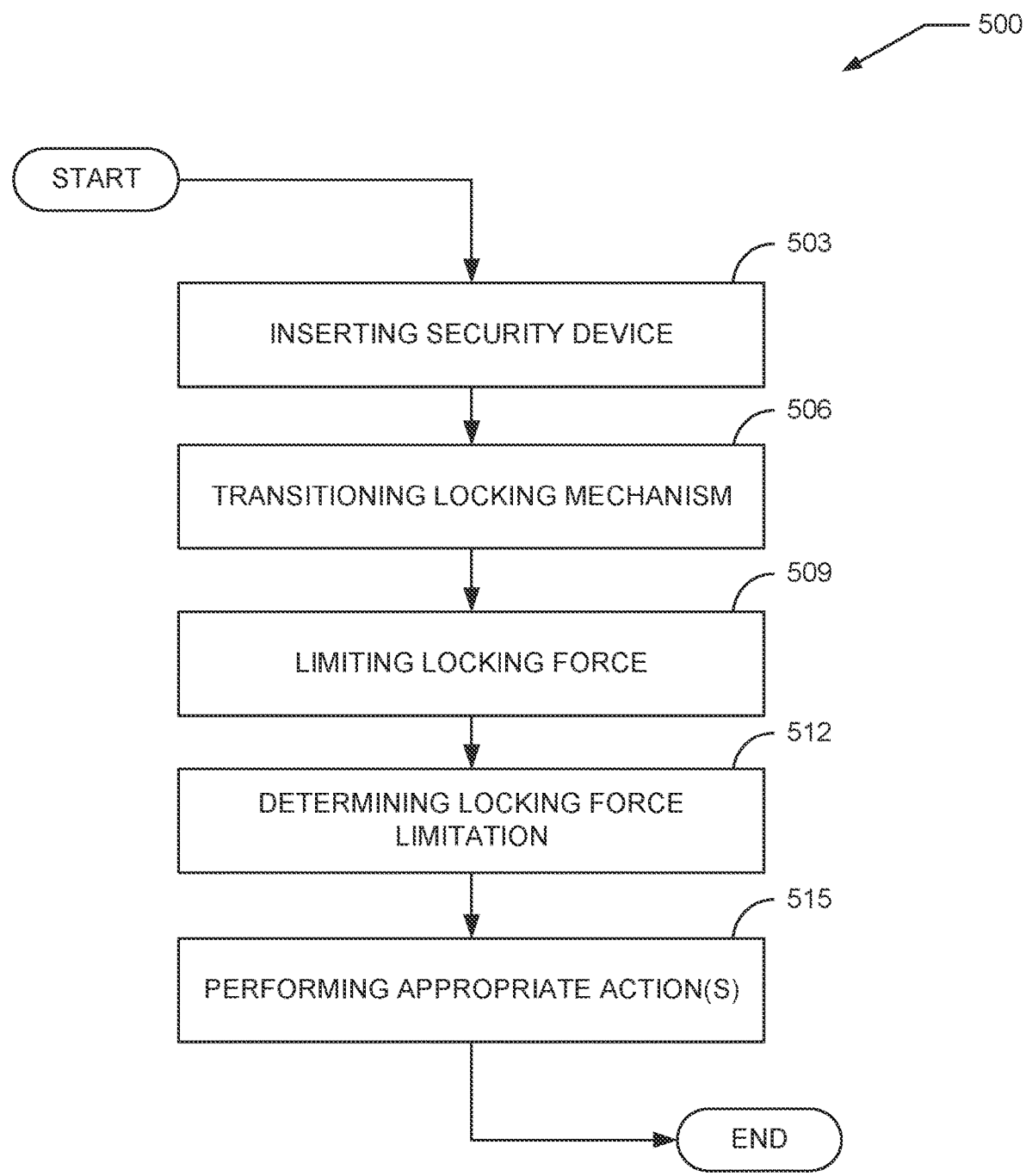
FIG. 5 is a flowchart of an exemplary locking process, according to one embodiment of the present disclosure.

Before turning to the process flow diagrams of FIG. 5, it is noted that embodiments described herein may be practiced using an alternative order of the steps illustrated in FIG. 5. That is, the process flows illustrated in FIG. 5 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope of the embodiments.

FIG. 5 shows an exemplary locking process 500. In various embodiments, by the locking process 500, a security device (e.g., a security device 100 as shown in FIGS. 1A-4C) can be secured to a target site via a locking mechanism such that the locking mechanism is disengaged to prevent removal of the security device.

At step 503, the process 500 includes inserting a security device to a target site, such as a cup holder. A user can position the security device into the target site. The security device can generally conform to a shape of the target site. In one example, the target site is a cup holder and the security device includes a generally cylindrical outer shape that conforms to the outer shape of a cup to fit into the cup holder.

At step 506, the process 500 includes transitioning a locking mechanism of the security device from an unlocked state to a locked state. Transitioning to the locked state can include rotating a first portion of the security device relative to a second portion of the security device in a particular direction to cause one or more legs to contact the target site. Upon the one or more legs contacting the target site, the first portion can be further rotated to apply a locking force to the one or more legs via the locking mechanism, thereby causing the one or more legs to apply a force to the target site that opposes the removal of the security device from its inserted position.

At step 509, the process 500 includes limiting, via a force-limiting mechanism, a locking force of the locking mechanism. Limiting the locking force of the locking mechanism can include causing the first portion to slip relative to the second portion when the locking force exceeds a predefined threshold. One or more protrusions can push against an inclined plane causing a rotational force to include a vertical component and a horizontal component. The horizontal component can refer to a force acting along a plane of rotation, while the vertical component can refer to a force acting perpendicular to the plane of rotation corresponding to the rotational force. The vertical component can push the protrusion upward and apply a pressure against a spring. When the spring compresses, the protrusion can be pushed upward until the protrusion traverses the inclined plane thereby limiting the force of the horizontal component to a magnitude that causes the vertical component to compress the spring. The ratio of the vertical component to the horizontal component is based on an angle of the inclined plane.

In some embodiments, limiting the locking force of the locking mechanism includes generating feedback for indicating the same. The feedback can include audio feedback, tactile, feedback, visual feedback, or combinations thereof. In one example, upon rotating the first portion of the security device such that a locking force of the locking mechanism is limited, the force-limiting mechanism of the security device produces audible feedback, such as a "click." The feedback can indicate that an engagement component of the locking mechanism has transitioned from an engaged to a disengaged state (e.g., thereby preventing the transition of the locking mechanism from the locked state to the unlocked state). In another example, to notify the user that the locking force has been limited and/or that the engagement component has been disabled, the monitoring application can emit a sound through the speakers of the security device and activates a vibrational component in a predetermined a vibration sequence.

At step 512, the process 500 includes determining, via a sensing mechanism, that the force-limiting mechanism limited the locking force of the locking mechanism. Determining that the force-limiting mechanism limited the locking force of the locking mechanism can include detecting that the first portion has slipped relative to the second portion via the force limiting mechanism. For example, upon the force-limiting mechanism engaging, the slippage of the first portion causes an electrical circuit to be completed. In this example, the sensing mechanism detects the electrical circuit and, in response, determines that the force-limiting mechanism has limited the locking force of the locking mechanism. In various embodiments, upon completion of step 512, the locking mechanism is engaged such that one or more legs extend from the security device, contact a target site, and generate a force sufficient to oppose forces seeking to remove the security device from the target site. In some embodiments, in response to determining the force-limiting mechanism has limited locking force of the locking mechanism, the monitor application (e.g., or another element of or in communication with the security device) generates one or more feedback signals for indicating the same. For example, the monitor application causes an audible "click" signal to be emitted from a speaker of the security device. In another example, the monitoring application activates a vibrational element. In another example, the monitoring application commands one or more light sources to activate in a predetermined light pattern.

At step 515, the process 500 includes performing one or more appropriate actions in response to the determination that the force-limiting mechanism limited the locking force. The one or more appropriate actions include but are not limited to disabling the locking mechanism, activating an indicator, activating a feedback mechanism, transmitting a notification, and generating a user interface. Disabling the locking mechanism can include mechanically decoupling the first portion of the security device from the one or more legs. In one example, in response to determining that the force-limiting mechanism limited the locking force, the sensing component causes the engagement component to disengage a mechanical connection between the engagement component and the force-limiting mechanism. In this example, the disengagement of the engagement component mechanically decouples the first portion from the one or more legs. Continuing the example, subsequent rotation of the first portion about the second portion causes no effect to the locking mechanism, thereby securing the security device against theft.

Activating an indicator can include causing a light source, such as an LED, to emit light at particular period, frequency, or wavelength, or causing an audio source to emit a predetermined sound, such as a click or personalized message. Activating a feedback mechanism can include generating haptic feedback, such as a vibration, or applying a rotational force to a first portion of the security device or a tapping haptic force. In one example, in response to detecting the limiting of the locking force, the feedback mechanism initiates a vibration element (e.g., such as an unbalanced electric motor or other suitable mechanism), thereby vibrating the security device such that a user is notified of the locked state. As another example, the sensing mechanism detects the limiting of the locking force in response to rotation of the first portion in a first direction. In the same example, the feedback mechanism applies a rotational force to the first portion of the security device in a second direction, thereby indicating to a user that further rotation in the first direction is an invalid action.

Transmitting the notification can include transmitting an electronic communication (e.g., a text message, instant message, push alert, phone call, electronic mail, etc.) to a computing device, such as a smartphone, with which the vehicle, security device, or user thereof is associated. The notification can include a message notifying the recipient of the locked state of the security device. The notification can include additional information, such as, for example, a current location of the security device or vehicle and a time at which the security device was secured to the target site.

A computing device (e.g., such as the computing device 203 shown in FIG. 2) can generate a user interface in response to the determination that a locking force has been limited (e.g., or in response to receiving a notification indicating the same). The user interface can include selectable fields for receiving an input from a user, such as, for example, a command to disable a locking mechanism of the security device or a command to ignore or silence the notification (e.g., for a predetermined time period and/or until another determination or notification is generated). The computing device can perform actions based on input received, or not received, via the user interface. For example, in response to receiving a selection to disable the locking mechanism, the computing device automatically transmits a corresponding command to the security device. In another example, the computing device renders a user interface and determines that a predetermined time period (e.g., 1 second, 5 seconds, 30 seconds, etc.) has elapsed without receiving an input. In this example, the computing device automatically sends a command to the security device to disable the locking mechanism.

One or more predetermined actions can be performed in an escalating manner, for example, in response to detecting multiple instances in which the force-limiting mechanism limited a locking force of the locking mechanism. As one example, in response to a first instance of detecting limitation of the locking force, an indicator emits a colored light (e.g., a green light) at a particular frequency (e.g., every 0.5 seconds, every 2 seconds, etc.) and for a particular duration (e.g., 5 seconds, 10 seconds, etc.). In the same example, in response to a second instance of detecting limitation of the locking force, the indicator (e.g., or a second indicator) emits a colored light in which the color, frequency, and/or duration of the emitted light may be varied as compared to the light emitted in response to the first instance. In another example, a first instance of locking force limitation causes an indicator to emit a colored light and a second instance of locking force limitation causes a feedback mechanism to vibrate the security device. In another example, detecting a first instance of locking force limitation causes an indicator to emit a colored light, detecting a second instance of locking force limitation causes the indicator to emit an audible "click," and detecting a third instance of locking force limitation causes the indicator to emit a second audible "click" and causes a haptic feedback mechanism to vibrate the security device.

Figure 6:
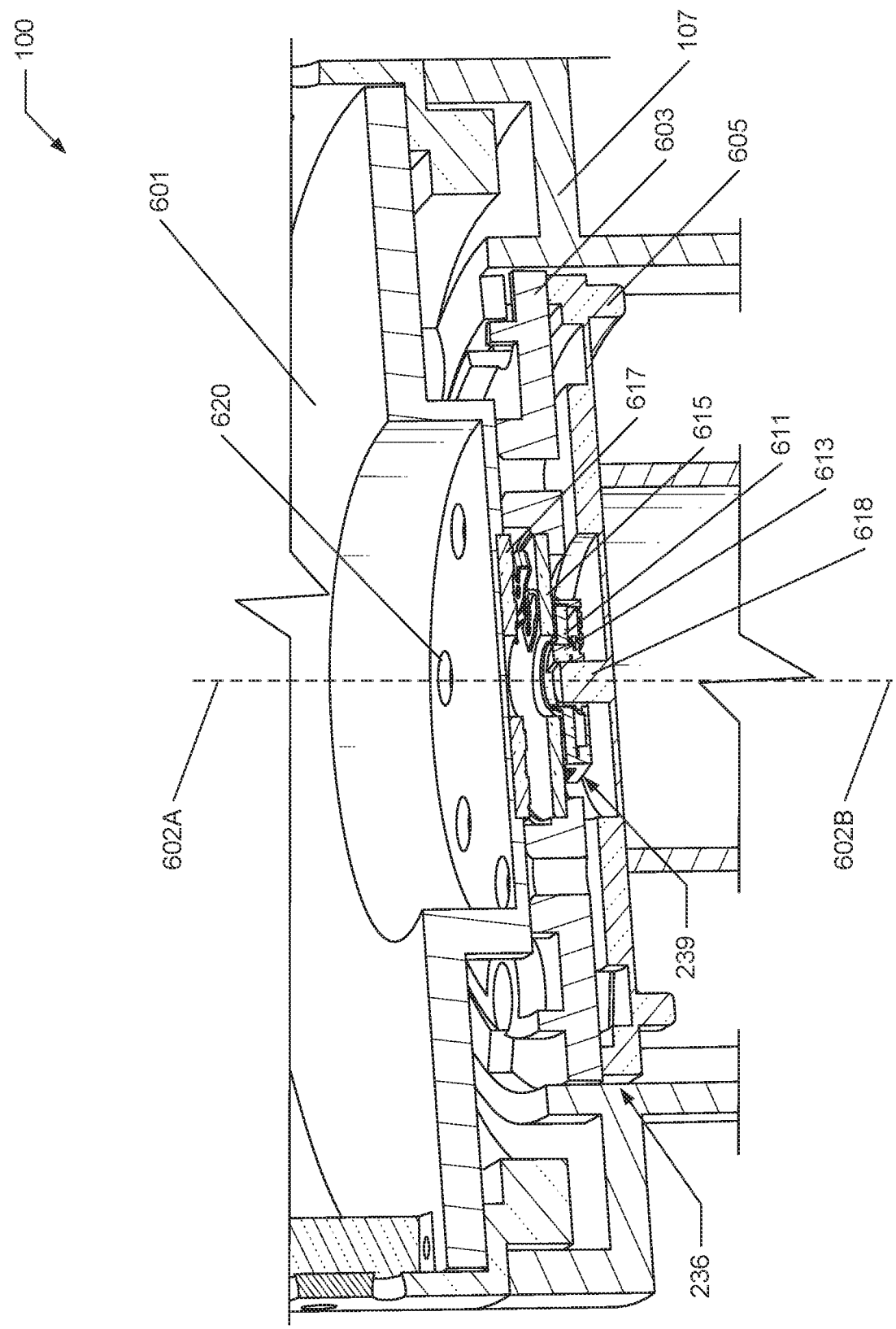
FIG. 6 shows an exemplary security device, according to one embodiment of the present disclosure.

FIG. 6 shows an exemplary security device 100. The security device 100 can include a first disk 601, second disk 603, and third disk 605 that can rotate about a central axis 602A, 602B. In some embodiments, the first disk 601 corresponds to a first portion 105 (see FIG. 1). In one example, an engagement component 233 (not shown, see FIGS. 3A-B) couples the first disk 601 to the second disk 603. The engagement component 233 can engage by rotation of the cam 309 to allow the connection plate 307 to move toward the first disk 601. One or more pins on the connection plate 307 can pass through the apertures 620 in the first disk 601 and the second disk 603. In this example, rotation of the first disk 601 in a first direction causes corresponding rotation of the second disk 603 in the first direction because the pins rotationally couple the first disk 601 to the second disk 603. A force-limiting mechanism 236 can translate a rotational force from the second disk 603 to the third disk 605, thereby causing rotation of the third disk 605.

In various embodiments, when engagement component 233 disengages the pins of the connection plate 307 from the apertures 620 by rotating the cam 309, the first disk 601 may be freely rotated (e.g., without causing corresponding rotation of the second disk 603 or third disk 605). In some embodiments, the force-limiting mechanism 236 can enable providing less than the limiting force. As an example, when the engagement component 233 engages the first disk 601 with the second disk 603, rotation of the first disk and the second disk 603 causes the protrusion 405 to contact the one or more inclined planes 407 to translate the force to rotate the third disk 605. The first and second disk 601, 603 can rotate back and forth on the track 402 between a current set of inclined planes 407 and an opposite wall of a respective previous inclined plane 407 (e.g., a wall corresponding to a non-inclining side of the inclined plane 407 as contacted when retracting the one or more legs 104A, 104B by turning in the second direction). In one example, the first and second disk 601,603 can rotate freely relative to the third disk 605 between two points (referred to as a free rotation band of the track 402) of approximately 60 degrees (e.g., slightly less than 60 degrees based on a length of the inclined plane 607) without retracting or extending the legs. Rotation further in the first direction causes the protrusion 405 to contact the inclined plane 407 and rotate the third disk 605 to extend the one or more legs 104A, 104B. Rotation further in the second direction causes the protrusion 405 to contact an opposite wall of the inclined plane 407 and rotate the third disk 605 in the second direction to retract the one or more legs 104A, 104B.

The security device 100 can include a sensing mechanism 239. In some embodiments, the sensing mechanism 239 includes a potentiometer by which the monitor application 215 determines whether or not the force-limiting mechanism 236 has limited a locking force of the security device 100. The sensing mechanism 239 can include a first portion 611 and a second portion 613 of the potentiometer, the first portion 611 being rotatable about the second portion 613. The potentiometer can output a range of resistances based on a position of the first portion 611 relative to the second portion 613. A monitor application can determine a state of the sensing mechanism 239 by reading a value of electrical resistance across the first portion 611 and the second portion 613, and determining an angle based on the value of electrical resistance (e.g., by comparing the value to a relational table of resistances and angles).

The first portion 611 can be coupled to the second disk 603 such that the first portion 611 rotates with the second disk 603. The second portion 613 can be coupled to the third disk 605 such that the second portion 613 rotates with the third disk 605. The sensing mechanism 239 can include a first plate 615 affixed to the second disk 603 and the first portion 611 (e.g., thereby coupling the first portion 611 to the second disk 603). The sensing mechanism 239 can include a second plate 617 that affixes to the first disk 601 such that the second plate 617 rotates with the first disk 601. The first plate 615 and the second plate 617 can include two or more electrical connections between one another and the two or more electrical connections can couple to the first portion 611 of the potentiometer. The second portion 613 and first portion 611 can be conductively coupled such that rotation of the second portion 613 within the first portion 611 causes a change in electrical resistance in an electrical circuit formed by the second portion 613 and first portion 611.

The sensing mechanism 239 can measure a level of electrical resistance across the first portion 611 and second portion 613, and a monitor application can read the level of electrical resistance to determine a state of the force-limiting mechanism 213 (e.g., whether a force has been limited, a current angular position of the second disk 603, etc.). The level of electrical resistance across the first portion 611 and second portion 613 can change based on the degree of rotation between the first portion 611 and second portion 613. The monitor application 215 can determine a state or position of the force-limiting mechanism 236 by comparing a measured resistance level to a relational table of resistances levels and angular positions. For example, the potentiometer may have a range of 10 k ohm to 100 k ohm resistance such that a range of 0 to 360 degrees of rotation is mapped to resistance values between 10 k ohm and 100 k ohm (or some other lower and upper value). The monitor application 215 may read a current resistance value of the potentiometer. The monitor application 215 can determine an angular position of the second disk 603 relative to the third disk 605 about the axis 602A-602B based on the current resistance value.

The fixed portion 618 of the third disk 605 can be positioned in a central aperture of the potentiometer. In one embodiment, the fixed portion 618 is a half cylindrical protrusion and the second portion 613 of the potentiometer is also a half cylindrical shape. The two half cylindrical shapes mate to form a cylinder to substantially fill the central aperture of the potentiometer. When the second disk 603 rotates relative to the third disk 605, the second portion 613 is forced to similarly rotate about the first portion 611 of the potentiometer by the fixed portion 618 of the third disk 605. As an example, when the first disk 601 and second disk 603 rotate relative to the third disk 605, the fixed portion 618 prevents the second portion 613 from rotating with the first portion 611 relative to the third disk 605 thereby causing the second portion 613 to rotate relative to the first portion 611. The monitor application 215 can read an angular distance of the rotation of the first portion 611 relative to the second portion based on a change in resistance of the potentiometer.

The potentiometer may include an unreadable band (e.g., 15 degrees, 25 degrees, etc.) of angles such that the potentiometer may only provide a resistance between 0 degrees and an upper bound reading (e.g., 335 degrees). In this example, rotation between 335 degrees and 359 degrees may yield 0 ohms resistance and rotation to 360 degrees may yield back at the lowest value resistance in the range. When 0 ohms is read, the monitor application 215 may determine that the potentiometer is in the unreadable band until such a time as the resistance moves to within the lower to upper limits of the potentiometer. The unreadable band may correspond to a portion of the track 402 between the inclined plane 407 and an opposite wall of a respective previous inclined plane 407 such that the monitor application 215 never reads within the unreadable band when the protrusion 405 is in contact with the inclined plane 407 on either side.

The monitor application 215 can determine that the protrusion 405 rotates along the free rotation band of the track 402 by reading the potentiometer resistance values. If the resistance values correspond to a rotation between a segment range of a current force limiting segment (each slip of the force-limiting mechanism 236 causes the force-limiting mechanism 236 to move to another segment), the monitor application 215 can determine the force-limiting mechanism 236 has not engaged. In one example, the segment ranges can correspond to 0-59.9 degrees, 60-119.9 degrees, 120-179.9 degrees, 180-239.9 degrees, 240-299.9 degrees, and 300-360 degrees. When the monitor application 215 reads that the measurements are outside of a current segment range (e.g., value changes to 188 degrees when previously measuring between 120 and 179.9 degrees), the monitor application 215 can determine that the force limiting mechanism 236 has limited the force or activated (e.g., slipped). The monitor application 215 can disengage the engagement component 233 in response to determining that the force limiting mechanism 236 has a limited the force.

The user may experience that rotating the first portion relative to the second portion in the first direction causes the legs 104 to protrude until a certain "tightness" is reached. Once the tightness is reached, the user may experience a "click" sensation (e.g., a sensation caused by the clutch slipping) and the first portion may freely rotate about the second portion to signal to the user that the security device 100 is properly secured. During this experience, the engagement component 233 may start out engaged. Rotating the first portion causes the first disk 601 and second disk 603 to rotate in the first direction. The one or more inclined planes 407 can contact the protrusion 405 to cause the third disk 605 to rotate. The rotation of the third disk 605 can cause the legs 104 to extend until the legs contact an inner surface of a cup holder of the vehicle 206. Once a force against the inner surface of the cup holder by the legs exceeds a predetermined force, the force-limiting mechanism 236 can slip to prevent damage to the cup holder. The monitor application 215 can determine the force-limiting mechanism 236 slipped by determining a reading of the sensing mechanism 239 is outside of a current segment range. The monitor application 215 can cause the engagement component 233 to disengage.

In some embodiments, the monitor application 215 perform an action in response to determining the force-limiting mechanism 236 has slipped, such as causing the engagement component 233 to disengage, transmitting an alert, generating a user interface for controlling the engagement component 233, or generating an effect at the security device 100 (e.g., by activating a light or audio element). At a subsequent point in time to when the engagement component 233 is disengaged, the owner user may wish to remove the security device 100 from the vehicle 206. With the engagement component 233 disengaged, rotating the first portion relative to the second portion will not retract the legs 104. The owner user can send a request, via a computing device 203, to cause the engagement component 233 to engage. The monitor application 215 can receive the engage request from the computing device and cause the engagement component 233 to engage (e.g. by rotating the cam 309 to cause the pins of the connection plate 307 to pass through apertures 620). The monitor application 215 can receive the request to engage the engagement component 233 locally. For example, the user can input a preconfigured pattern (e.g., a rotation pattern of yellow, red, blue, and green) of inputs using inputs of the security device 100.

Figure 7:
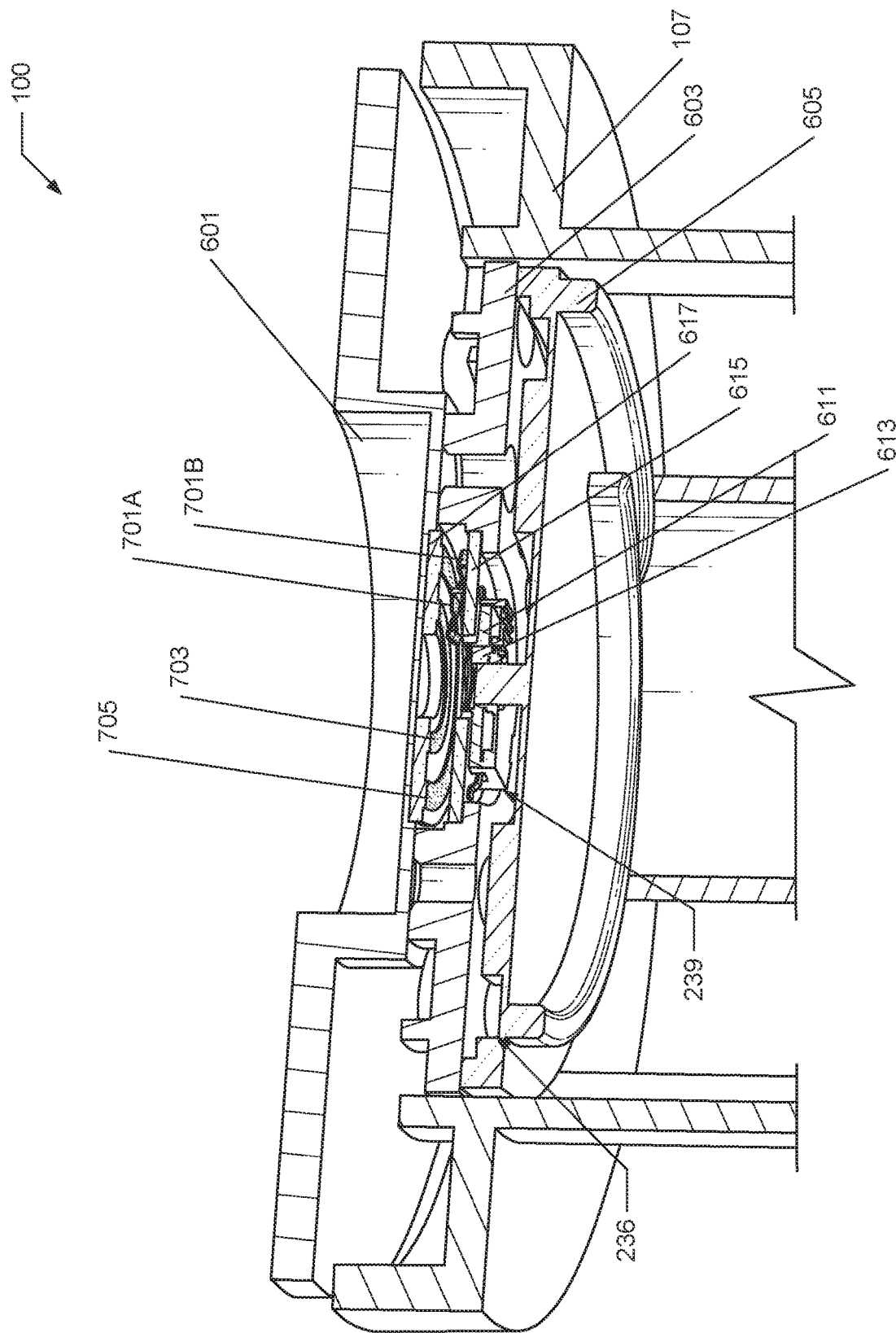
FIG. 7 shows an exemplary security device, according to one embodiment of the present disclosure.

FIG. 7 shows an exemplary security device 100. The sensing mechanism can include a first contact 701A and a second contact 701B that are integrally formed with or affixed to the first plate 615 or second plate 617. The first contact 701A and second contact 701B can be biased to contact the first plate 615 and/or the second plate 617. The second plate 217 can include conductive portions 703A, 703B. The first contact 701A and/or second contact 701B can electrically couple the conductive portions 703A, 703B to the first portion 611 of the sensing mechanism 239.

A computing circuit (e.g., a processor on which the monitor application 215 is executed) of the security device 100 can be electrically couple to the sensing mechanism 239 by electrically connecting to the conductive portions 703A, 703B, thereby allowing the monitor application 215 to read a signal from the sensing mechanism 239. In one embodiment, the computing circuit is positioned in the first portion 105 such that an electrical wire from the potentiometer would twist if the first portion 105 rotated relative to the second portion. However, the contacts 701A, 701B and the conductive portions 703A, 703B can mechanically decouple the potentiometer from the computing circuit while allowing the potentiometer to be electrically coupled to the computing circuit. Stated differently, the first plate 615 can rotate relative to the second plate 617 without "twisting" any wires from the rotation while still maintaining electrical connectivity via the contacts 701A, 701B and the conductive portions 703A, 703B.

Various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented.

Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. An affixable device, comprising:
   a locking mechanism comprising an engagement component, the engagement component configured to disable the locking mechanism;
   a first portion of a cylindrical body;
   a second portion of the cylindrical body, wherein when the engagement component is engaged, the first portion configured to:
   rotate about the second portion in a first direction to engage the locking mechanism; and
   rotate about the second portion in a second direction to disengage the locking mechanism;
   a force-limiting mechanism configured to limit a locking force of the locking mechanism; and
   a sensing mechanism coupled to the engagement component, wherein: the sensing mechanism comprises:
   a first conductive ring affixed to the first portion;
   a second conductive ring affixed to the first portion, wherein the first conductive ring and the second conductive ring are disconnected from each other;
   a third conductive ring affixed to the second portion and comprising a plurality of conductors spaced radially along the third conductive ring;
   a first conductive protrusion extending from the first conductive ring in a direction of the third conductive ring and configured to apply a pressure to the third conductive ring; and
   a second conductive protrusion extending from the second conductive ring in a direction of the plurality of conductors and configured to contact individual ones of the plurality of conductors, wherein:
   a rotation of the first portion relative to the second portion causes the first conductive protrusion and the second conductive protrusion to rotate around the third conductive ring and further causes the second conductive protrusion to contact the individual ones of the plurality of conductors, and
   wherein the first conductive protrusion and the second conductive protrusion are configured to complete an electrical connection between the first conductive ring and the second conductive ring while the second conductive protrusion is in contact with one of the plurality of conductors; and
   the sensing mechanism is configured to:
   determine that the force-limiting mechanism has limited the locking force of the locking mechanism; and
   in response to the force-limiting mechanism limiting the locking force, cause the engagement component to disable the locking mechanism.

2. The affixable device of claim 1, wherein the force-limiting mechanism comprises a slip clutch mechanism.

3. The affixable device of claim 1, wherein the sensing mechanism comprises:
   a first circuit section
   at least one contact configured to, in response to the force-limiting mechanism limiting the locking force, provide the electrical connection between the first circuit section and the second circuit section via at least one of the plurality of conductors.

4. The affixable device of claim 1, wherein the force-limiting mechanism comprises a plurality of retention mechanisms, wherein each retention mechanism of the plurality of retention mechanisms comprises a respective spring and a respective protrusion.

5. A vehicle theft-prevention device, comprising:
   at least one computing device configured to determine an intrusion into a vehicle based at least in part on at least one sensor measurement;
   a locking mechanism comprising an engagement component, the engagement component configured to disable the locking mechanism;
   a force-limiting mechanism configured to limit a locking force of the locking mechanism;
   a sensing mechanism coupled to the engagement component, wherein the sensing mechanism is configured to:
   determine that the force-limiting mechanism has limited the locking force of the locking mechanism; and
   in response to the force-limiting mechanism limiting the locking force, cause the engagement component to disable the locking mechanism,
   a first portion comprising a plurality of retractable protrusions positioned at a predetermined radius from a center of the first portion, each of the plurality of retractable protrusions comprises a respective spring and a respective spherical ball; and
   a second portion comprising a plurality of inclined planes positioned at the predetermined radius from a center of the second portion.

6. The vehicle theft-prevention device of claim 5, wherein the sensing mechanism causes the engagement component to disable the locking mechanism by providing an electrical signal to the at least one computing device, and the at least one computing device is further configured to:

receive the electrical signal from the sensing mechanism; and disable the engagement component of the locking mechanism.

7. The vehicle theft-prevention device of claim 6, wherein disabling the engagement component of the locking mechanism comprises providing an electric signal to a motor unit comprising a cam, wherein the motor unit is configured to rotate the cam to in response to receiving the electric signal.

8. The vehicle theft-prevention device of claim 7, wherein the cam is configured to pull a plurality of pins from within a plurality of apertures to mechanically decouple the first portion from a plurality of legs.

9. The vehicle theft-prevention device of claim 5, wherein the sensing mechanism comprises two substantially parallel protrusions.

10. The vehicle theft-prevention device of claim 5, wherein the locking force is limited by the force-limiting mechanism when the locking force causes the respective spherical ball from each of the plurality of retractable protrusions to compress the respective spring to pass over one of the plurality of inclined planes.

11. A method of affixing a device, comprising:
rotating a first portion of the device relative to a second portion of the device in a particular direction to transition a locking mechanism from an unlocked state to a locked state;
limiting, via a force-limiting mechanism, a locking force to rotate the first portion relative to the second portion when the locking force exceeds a predefined threshold;
determining, via a sensing mechanism comprising two substantially parallel protrusions extending from the first portion toward the second portion, that the force-limiting mechanism limited the locking force;
applying, via the two substantially parallel protrusions, a spring loaded force on the second portion;

causing, via the sensing mechanism, an engagement component to disable the locking mechanism in response to determining that the force-limiting mechanism limited the locking force; and rotating the first portion of the device relative to the second portion of the device further comprises causing the two substantially parallel protrusions to rotate about a conductive ring of the second portion such that a conductive surface of one of the two substantially parallel protrusions contacts the conductive ring and a second conductive surface of another one of the two substantially parallel protrusions contacts one of a plurality of conductors spaced radially around the conductive ring, wherein the plurality of conductors are conductively connected to the conductive ring.

12. The method of claim 11, further comprising rotating, via a motor unit, a cam of the engagement component to disable the locking mechanism.

13. The method of claim 11, further comprising rotating, via a motor unit, a cam of the engagement component to enable the locking mechanism.

14. The method of claim 11, wherein determine that the force-limiting mechanism limited the locking force further comprises completing a circuit via the two substantially parallel protrusions.

15. The method of claim 11, further comprising:
causing the engagement component to enable the locking mechanism in response to receiving a command from a mobile device; and
subsequent to the locking mechanism being enabled, rotating the first portion of the device relative to the second portion of the device in a direction opposite the particular direction to transition the locking mechanism from the locked state to the unlocked state.

* * * * *